US009353668B2

(12) United States Patent
Noguchi et al.

(10) Patent No.: US 9,353,668 B2
(45) Date of Patent: May 31, 2016

(54) CONSTRUCTION MACHINE

(71) Applicant: Hitachi Construction Machinery Co., Ltd., Tokyo (JP)

(72) Inventors: Shuuhei Noguchi, Higashiomi (JP); Hajime Yoshida, Omihachiman (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 0 days.

(21) Appl. No.: 14/893,017

(22) PCT Filed: May 19, 2014

(86) PCT No.: PCT/JP2014/063195
§ 371 (c)(1),
(2) Date: Nov. 20, 2015

(87) PCT Pub. No.: WO2014/188997
PCT Pub. Date: Nov. 27, 2014

(65) Prior Publication Data
US 2016/0102593 A1 Apr. 14, 2016

(30) Foreign Application Priority Data
May 22, 2013 (JP) ................. 2013-108135

(51) Int. Cl.
*F01N 3/023* (2006.01)
*F01N 9/00* (2006.01)
*E02F 9/20* (2006.01)

(52) U.S. Cl.
CPC .............. *F01N 9/002* (2013.01); *E02F 9/2025* (2013.01); *F01N 3/023* (2013.01); *F01N 2900/08* (2013.01); *F01N 2900/1606* (2013.01)

(58) Field of Classification Search
CPC ..... F01N 9/002; F01N 3/023; F01N 2900/08; F01N 2900/1606; E02F 9/2025

USPC .......................................................... 701/50
See application file for complete search history.

(56) References Cited

U.S. PATENT DOCUMENTS

| 6,907,873 B2 * | 6/2005 | Hamahata | ............... F01N 9/002 123/676 |
| 7,065,960 B2 * | 6/2006 | Gioannini | ............... F01N 9/002 60/274 |
| 2006/0032217 A1 | 2/2006 | Kondou et al. | |
| 2009/0183495 A1 | 7/2009 | Onodera et al. | |
| 2012/0116645 A1 | 5/2012 | Hamahata et al. | |

FOREIGN PATENT DOCUMENTS

| JP | 11-13455 A | 1/1999 |
| JP | 2002-256846 A | 9/2002 |

(Continued)

OTHER PUBLICATIONS

International Search Report (PCT/ISA/210) issued in PCT Application No. PCT/JP2014/063195 dated Jul. 16, 2014 with English Translation (Seven (7) pages).

(Continued)

Primary Examiner — Richard Camby
(74) Attorney, Agent, or Firm — Crowell & Moring LLP

(57) ABSTRACT

A regeneration device burns particulate matter trapped in a filter in an exhaust gas purifying device to execute regeneration treatment of the filter. The regeneration device performs a determination whether or not the regeneration treatment is executed using a first estimated trapping quantity (H1) estimated based upon a differential pressure ($\Delta P=P1-P2$) as a difference between pressure (P1) in an inlet side and pressure (P2) in an outlet side of the filter and a second estimated trapping quantity (H2) estimated based upon a rotational speed (N) of an engine, a fuel injection quantity (F) and an exhaust gas temperature (GT). In this case, the determination whether or not the regeneration treatment is executed is performed using only the second estimated trapping quantity (H2) when the engine is in a predetermined low rotational condition.

6 Claims, 13 Drawing Sheets

(56) References Cited

FOREIGN PATENT DOCUMENTS

| | | |
|---|---|---|
| JP | 2006-77761 A | 3/2006 |
| JP | 2007-332801 A | 12/2007 |
| JP | 2010-65577 A | 3/2010 |
| JP | 2011-37334 A | 2/2011 |

OTHER PUBLICATIONS

Japanese-language Written Opinion (PCT/ISA/237) issued in PCT Application No. PCT/JP2014/063195 dated Aug. 12, 2014 (Five (5) pages).

\* cited by examiner

US 9,353,668 B2

CONSTRUCTION MACHINE

TECHNICAL FIELD

The present invention relates to a construction machine that is provided with an exhaust gas purifying device used suitably for removing harmful substances from an exhaust gas in a diesel engine, for example, or the like.

BACKGROUND ART

A construction machine such as a hydraulic excavator, a hydraulic crane and the like is generally configured by an automotive lower traveling structure, an upper revolving structure revolvably mounted on the lower traveling structure, and a working mechanism tiltably mounted on a front side of the upper revolving structure. The upper revolving structure mounts an engine on a rear part in a revolving frame for driving a hydraulic pump, and mounts a cab, a fuel tank, an operating oil tank and the like on a front side in the revolving frame.

Here, a diesel engine is generally used as an engine that operates as a prime mover of the construction machine. There are some cases where harmful substances such as particulate matter (PM) and nitrogen oxides (NOx) are contained in an exhaust gas emitted from such a diesel engine. Therefore, the construction machine is provided with an exhaust gas purifying device in an exhaust pipe forming an exhaust gas passage of the engine for purifying an exhaust gas therein.

The exhaust gas purifying device is configured by including an oxidation catalyst (for example, diesel oxidation catalyst, referred to as "DOC" for short) for oxidizing and removing nitrogen monoxides (NO), carbon monoxides (CO), hydrocarbon (HC) that are contained in an exhaust gas, and a particulate matter removing filter (for example, diesel particulate filter, referred to as "DPF" for short) that is arranged downstream of the oxidation catalyst for trapping and removing particulate matter in the exhaust gas (Patent Document 1).

Incidentally, in the particulate matter removing filter, the particulate matter deposits therein following the trapping of the particulate matter, which might cause the filter to be clogged. Therefore, it is necessary to remove the particulate matter from the filter in the point in time where a predetermined quantity of the particulate matter is trapped for regenerating the filter. This regeneration treatment of the filter can be executed in such a manner that fuel injection for regeneration treatment called, for example, "post injection" is performed to increase a temperature of an exhaust gas for burning the particulate matter that has deposited in the filter.

On the other hand, when the regeneration treatment of the filter is executed in a state where the particulate matter is excessively deposited in the filter (excessive deposit), the temperature of the exhaust gas rises to be excessively high (a combustion temperature of the particulate matter is excessively high), which might possibly cause the filter to be melted and damaged. Therefore, the conventional art is configured such that a trapping quantity of the particulate matter trapped in the filter is estimated, and based thereon the regeneration treatment is executed before the estimated trapping quantity becomes excessively large.

More specifically, an emission quantity (generating quantity) of particulate matter that is emitted from the engine is estimated based upon a rotational speed of an engine and a fuel injection quantity, and the regeneration treatment is executed at the time the estimated quantity reaches a preset threshold value (Patent Document 2).

On the other hand, according to the other conventional art, a trapping quantity of the particulate matter trapped in the filter is estimated from a difference (differential pressure) between pressure in an inlet side and pressure in an outlet side of the filter, and the determination on whether or not the regeneration treatment is executed is made based upon the estimated trapping quantity (Patent Document 3).

PRIOR ART DOCUMENTS

Patent Documents

Patent Document 1: Japanese Patent Laid-Open No. 2010-65577 A
Patent Document 2: Japanese Patent Laid-Open No. Hei 11-13455 A
Patent Document 3: Japanese Patent Laid-Open No. 2007-332801 A

SUMMARY OF THE INVENTION

Incidentally, in an operating condition where the rotational speed of the engine is low, that is, in a low rotational condition thereof, an exhaust flow quantity from the engine becomes small to cause the differential pressure between the inlet side and the outlet side of the filter to become small, and pulsation of the differential pressure to be more likely to be unstable. Therefore, in a case of estimating the trapping quantity of the particulate matter trapped in the filter based upon the differential pressure between the inlet side and the outlet side of the filter, it is difficult to secure the estimation accuracy of the trapping quantity in the low rotational condition.

For example, in a case where the rotational speed of the engine rapidly changes from an operating condition of an intermediate speed or high speed (intermediate/high speed rotational condition) to a low rotational condition by auto idling control (control of automatically lowering the engine rotational speed to a low idling rotational speed), the trapping quantity is possibly estimated as an excessive value more than an actual trapping quantity by a combination of the smaller exhaust flow quantity and the smaller differential pressure. In a case of continuation of the low rotational condition, likewise, the trapping quantity is possibly estimated as an excessive value more than an actual trapping quantity. In such a case, the regeneration treatment is possibly executed regardless of no need of executing the regeneration treatment.

Therefore, in a case of the structure disclosed in Patent Document 3, at the time of the low rotational condition, the continuation time is counted, and the regeneration treatment is executed on a condition that the continuation time has elapsed over a predetermined determination time. On the other hand, in a case of a compact hydraulic excavator called "mini-excavator", for example, the engine is mostly waiting (is held) in the low rotational condition in the meantime of not performing an excavating work.

Therefore, application of the structure disclosed in Patent Document 3 to the compact hydraulic excavator leads to the following problems. That is, in a case of the compact hydraulic excavator, while the engine is waiting in the low rotational condition, every time the predetermined time elapses, unnecessary regeneration treatment is possibly executed, leading to deterioration of fuel consumption and degradation of durability. In addition, when the regeneration treatment is executed in the low rotational condition, fuel attached on a cylinder inner wall surface of the engine following the post injection drops into the oil pan, and the fuel is possibly mixed in engine oil. As a result, the fuel possibly causes dilution of the engine oil (oil dilution).

In view of the foregoing problems in the conventional art, it is an object of the present invention to provide a construction machine that can suppress execution of unnecessary regeneration treatment when an engine is in a low rotational condition.

(1) A construction machine according to the present invention comprises: an automotive vehicle body; an engine that is mounted on the vehicle body; an exhaust gas purifying device that is provided in an exhaust side of the engine and includes a filter for trapping particulate matter in an exhaust gas emitted from the engine; and a regeneration device that burns the particulate matter trapped in the filter in the exhaust gas purifying device to execute regeneration treatment of the filter, the regeneration device including: a first calculating unit that estimates a trapping quantity of the particulate matter trapped in the filter based upon at least a differential pressure ($\Delta P = P1-P2$) as a difference between pressure (P1) in an inlet side and pressure (P2) in an outlet side of the filter; a second calculating unit that estimates a trapping quantity of the particulate matter trapped in the filter based upon at least a rotational speed (N) of the engine, a fuel injection quantity (F) and an exhaust gas temperature (GT); and a regeneration determining unit that determines whether or not the regeneration treatment is executed using a first estimated trapping quantity (H1) estimated by the first calculating unit and a second estimated trapping quantity (H2) estimated by the second calculating unit.

In order to solve the aforementioned problem, a characteristic of a configuration adopted by the present invention is that the regeneration determining unit includes a low-rotational time processing unit that makes the determination using only the second estimated trapping quantity (H2) estimated by the second calculating unit when the engine is in a predetermined low rotational condition or using the first estimated trapping quantity (H1) estimated by the first calculating unit in the point in time where the engine becomes in the predetermined low rotational condition.

With this arrangement, when the engine is in the predetermined low rotational condition, by the low-rotational time processing unit the determination is made using only the second estimated trapping quantity (H2) estimated based upon the fuel injection quantity (F) and the like without using the first estimated trapping quantity (H1) estimated based upon the differential pressure ($\Delta P$) across the filter and the like. Alternatively, when the engine is in the predetermined low rotational condition, by the low-rotational time processing unit, the determination is made using the first estimated trapping quantity (H1) in the point in time where the engine becomes in the predetermined low rotational condition and the second estimated trapping quantity (H2).

That is, the low-rotational time processing unit does not use the first estimated trapping quantity (H1) accuracy of which possibly degrades as it is (disables the first estimated trapping quantity (H1) or fixes it to a value of a first estimated trapping quantity (H1) in the point in time where the engine becomes in the predetermined low rotational condition), for the determination on whether or not the regeneration treatment is executed in a case where the engine is in the low rotational condition. Therefore, it is possible to suppress the unnecessary regeneration treatment due to the degraded accuracy of the first estimated trapping quantity (H1). As a result, it is possible to perform an improvement on fuel consumption, an improvement on durability and suppression on dilution of engine oil (oil dilution).

(2) According to the present invention, the regeneration determining unit is configured to perform an automatic regeneration treatment determination that determines whether or not the regeneration treatment is automatically executed and a manual regeneration treatment determination that determines whether or not an alarm is given an operator to manually execute the regeneration treatment, and the low-rotational time processing unit, when the engine is in the predetermined low rotational condition, is configured to perform the automatic regeneration treatment determination and the manual regeneration treatment determination using only the second estimated trapping quantity (H2) by the second calculating unit or using the first estimated trapping quantity (H1) by the first calculating unit in the point in time where the engine becomes in the predetermined low rotational condition.

With this arrangement, when the engine is in the predetermined low rotational condition, the low-rotational time processing unit performs the automatic regeneration treatment determination and the manual regeneration treatment determination using only the second estimated trapping quantity (H2) without using the first estimated trapping quantity (H1). Alternatively, when the engine is in the predetermined low rotational condition, the low-rotational time processing unit performs the automatic regeneration treatment determination and the manual regeneration treatment determination using the first estimated trapping quantity (H1) in the point in time where the engine becomes in the predetermined low rotational condition and the second estimated trapping quantity (H2).

That is, the low-rotational time processing unit does not use the first estimated trapping quantity (H1) the accuracy of which possibly degrades as it is (disables the first estimated trapping quantity (H1) or fixes it to a value of a first estimated trapping quantity (H1) in the point in time where the engine becomes in the predetermined low rotational condition), for the automatic regeneration treatment determination and the manual regeneration treatment determination. Therefore, it is possible to suppress the unnecessary regeneration treatment and manual regeneration treatment due to the degraded accuracy of the first estimated trapping quantity (H1). As a result, it is possible to perform an improvement on fuel consumption, an improvement on durability and suppression of dilution of engine oil (oil dilution) in a high level.

(3) According to the present invention, the regeneration determining unit is configured to perform the automatic regeneration treatment determination that determines whether or not the regeneration treatment is automatically executed, the manual regeneration treatment determination that determines whether or not an alarm is given an operator to manually execute the regeneration treatment, and an excessive deposit determination that determines whether or not the particulate matter is deposited excessively in the filter, and the low-rotational time processing unit, when the engine is in the predetermined low rotational condition, is configured to perform the automatic regeneration treatment determination, the manual regeneration treatment determination and the excessive deposit determination using only the second estimated trapping quantity (H2) by the second calculating unit or using the first estimated trapping quantity (H1) by the first calculating unit in the point in time where the engine becomes in the predetermined low rotational condition.

With this arrangement, when the engine is in the predetermined low rotational condition, the low-rotational time processing unit performs the automatic regeneration treatment determination, the manual regeneration treatment determination and the excessive deposit determination using only the second estimated trapping quantity (H2) without using the first estimated trapping quantity (H1). Alternatively, when the engine is in the predetermined low rotational condition, the low-rotational time processing unit performs the automatic regeneration treatment determination, the manual regeneration treatment determination and the excessive deposit determination using the first estimated trapping quantity (H1) in the point in time where the engine becomes in the predetermined low rotational condition and the second estimated trapping quantity (H2).

That is, the low-rotational time processing unit does not use the first estimated trapping quantity (H1) the accuracy of which possibly degrades as it is (disables the first estimated trapping quantity (H1) or fixes it to a value of a first estimated trapping quantity (H1) in the point in time where the engine becomes in the predetermined low rotational condition), for the automatic regeneration treatment determination, the manual regeneration treatment determination and the excessive deposit determination. Therefore, it is possible to suppress the unnecessary automatic regeneration treatment, the manual regeneration treatment and the alarm of the excessive deposit due to the degraded accuracy of the first estimated trapping quantity (H1). As a result, it is possible to perform an improvement on fuel consumption, an improvement on durability and suppression of dilution of engine oil (oil dilution), and further, an improvement on reliability of the alarm of the excessive deposit.

(4) According to the present invention, the low-rotational time processing unit is configured to determine whether or not the engine is in the predetermined low rotational condition based upon the differential pressure ($\Delta P$), wherein when the differential pressure ($\Delta P$) is equal to or less than a predetermined value ($\Delta Pa1$), the determination is performed using only the second estimated trapping quantity (H2) by the second calculating unit or using the first estimated trapping quantity (H1) by the first calculating unit in the point in time where the differential pressure ($\Delta P$) becomes equal to or less than the predetermined value ($\Delta Pa1$).

With this arrangement, the low-rotational time processing unit is configured to determine whether or not the engine is in the predetermined low rotational condition based upon the differential pressure ($\Delta P$) across the filter. Therefore, the low rotational condition of the engine where the accuracy of the first estimated trapping quantity (H1) possibly degrades can be stably determined based upon the differential pressure ($\Delta P$).

(5) According to the present invention, the low-rotational time processing unit is configured to determine whether or not the engine is in the predetermined low rotational condition based upon a rotational speed (N) of the engine, wherein when the rotational speed (N) is equal to or less than a predetermined value (N1), the determination is performed using only the second estimated trapping quantity (H2) by the second calculating unit or using the first estimated trapping quantity (H1) by the first calculating unit in the point in time the rotational speed (N) becomes equal to or less than the predetermined value (N1).

With this arrangement, the low-rotational time processing unit is configured to determine whether or not the engine is in the predetermined low rotational condition based upon the rotational speed (N) of the engine. Therefore, the low rotational condition of the engine where the accuracy of the first estimated trapping quantity (H1) possibly degrades can be stably determined based upon the rotational speed (N).

(6) According to the present invention, the state where the engine is in the predetermined low rotational condition corresponds to a period from a state where the rotational speed (N) of the engine is higher than the predetermined value (N1) to a state where it becomes equal to or less than the predetermined value (N1) and again, is higher than the predetermined value (N1), the point in time the engine becomes in the predetermined low rotational condition corresponds to the point in time where the rotational speed (N) of the engine becomes equal to or less than the predetermined value (N1), and the first estimated trapping quantity (H1) by the first calculating unit continues to use the value in the point in time during a period from the point in time where the rotational speed (N) of the engine becomes equal to or less than the predetermined value (N1) to the point in time where it becomes again higher than the predetermined value (N1) (the point in time the rotational speed (N) of the engine becomes equal to or less than the predetermined value (N1)).

BRIEF DESCRIPTION OF THE DRAWINGS

FIG. 3 is a circuit configuration diagram showing an engine, an exhaust gas purifying device, a regeneration device, and the like.

MODE FOR CARRYING OUT THE INVENTION

Figure 1:
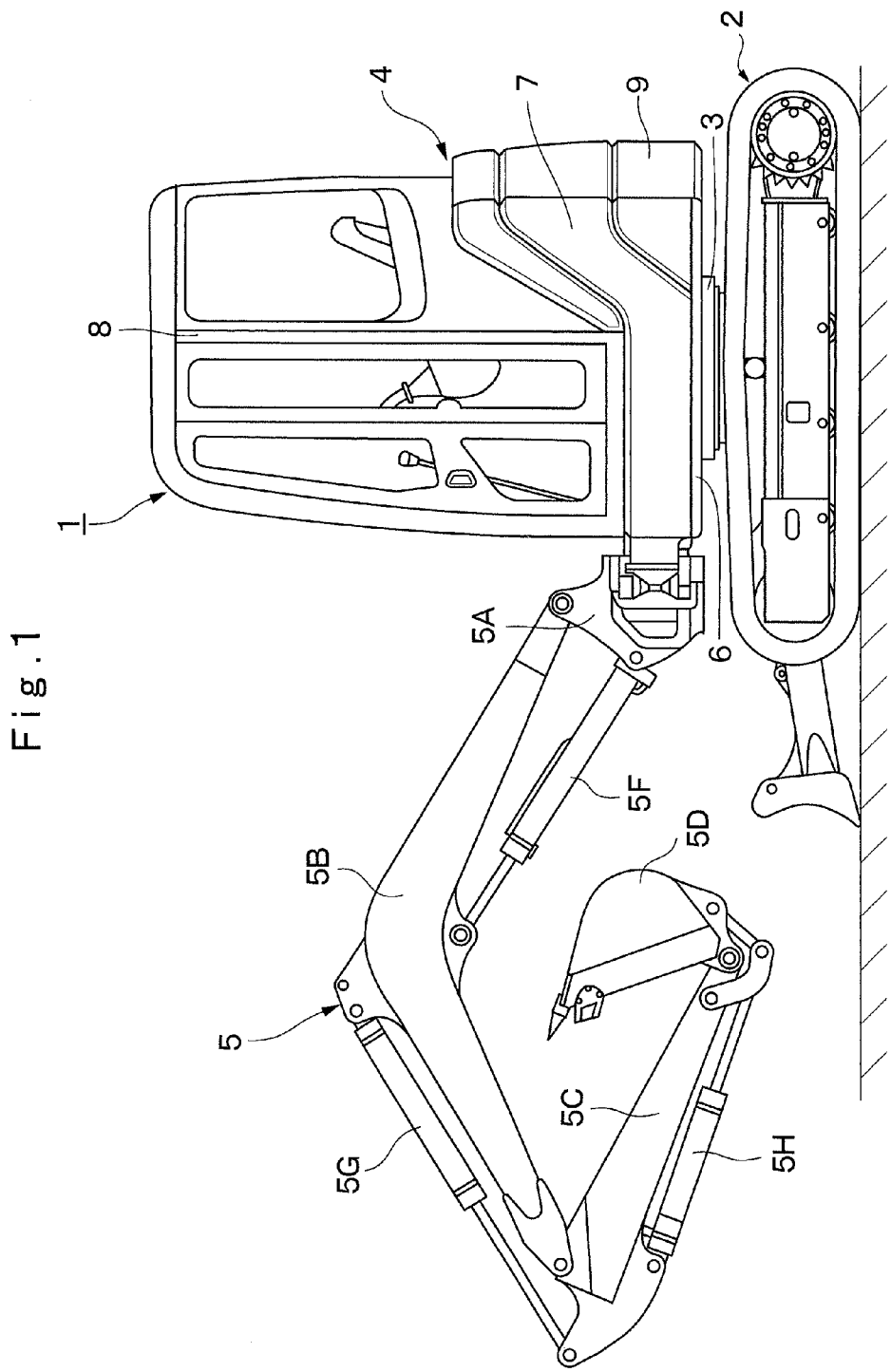
FIG. 1 is a front view showing a hydraulic excavator that is applied to a first embodiment of the present invention.

Hereinafter, embodiments of a construction machine according to the present invention will be in detail explained referring to the accompanying drawings by taking a case where the construction machine is applied to a compact hydraulic excavator called "mini excavator" as an example.

FIG. 1 to FIG. 8 show a first embodiment of a construction machine according to the present invention.

In the figure, indicated at 1 is a compact hydraulic excavator used for an excavating work of sand and earth or the like, and the hydraulic excavator 1 is typically called a mini excavator. The hydraulic excavator 1 is configured schematically by a crawler type of an automotive lower traveling structure 2, an upper revolving structure 4 that is mounted through a revolving device 3 on the lower traveling structure 2 to be capable of revolving thereon and configures a vehicle body together with the lower traveling structure 2, and a working mechanism 5 that is provided in a front side of the upper revolving structure 4 to be capable of lifting and tilting thereto.

Here, the working mechanism 5 is formed as a swing post type working mechanism, and is provided with, for example, a swing post 5A, a boom 5B, an arm 5C, a bucket 5D as a working tool, a swing cylinder 5E (refer to FIG. 2) for swinging the working mechanism 5 in the left-right direction, a boom cylinder 5F, an arm cylinder 5G, and a bucket cylinder 5H. The upper revolving structure 4 is configured by a revolving frame 6, an exterior cover 7, a cab 8 and a counterweight 9, which will be described later.

The revolving frame 6 forms part of a structure of the upper revolving structure 4. The revolving frame 6 is mounted through the revolving device 3 on the lower traveling structure 2. The revolving frame 6 is provided with the counterweight 9 and the engine 10 in the rear portion side, which will be described later, the cab 8 in the left front side which will be described later, and a fuel tank 16 in the left front side which will be described later. The revolving frame 6 is provided with the exterior cover 7 that is positioned from the right side to the rear side of the cab 8, and this exterior cover 7 defines a space that accommodates the engine 10, a hydraulic pump 15, a heat exchanger 17, the fuel tank 16, an exhaust gas purifying device 18 and the like, together with the revolving frame 6, the cab 8 and the counterweight 9.

The cab 8 is mounted in the left front side of the revolving frame 6, and the cab 8 defines therein an operator's room in which an operator gets. An operator's seat on which the operator is seated and various operational levers, further an alarming device 27 which will be described later, a manual regeneration switch 28, and the like are disposed inside the cab 8 (refer to FIG. 3).

Figure 2:
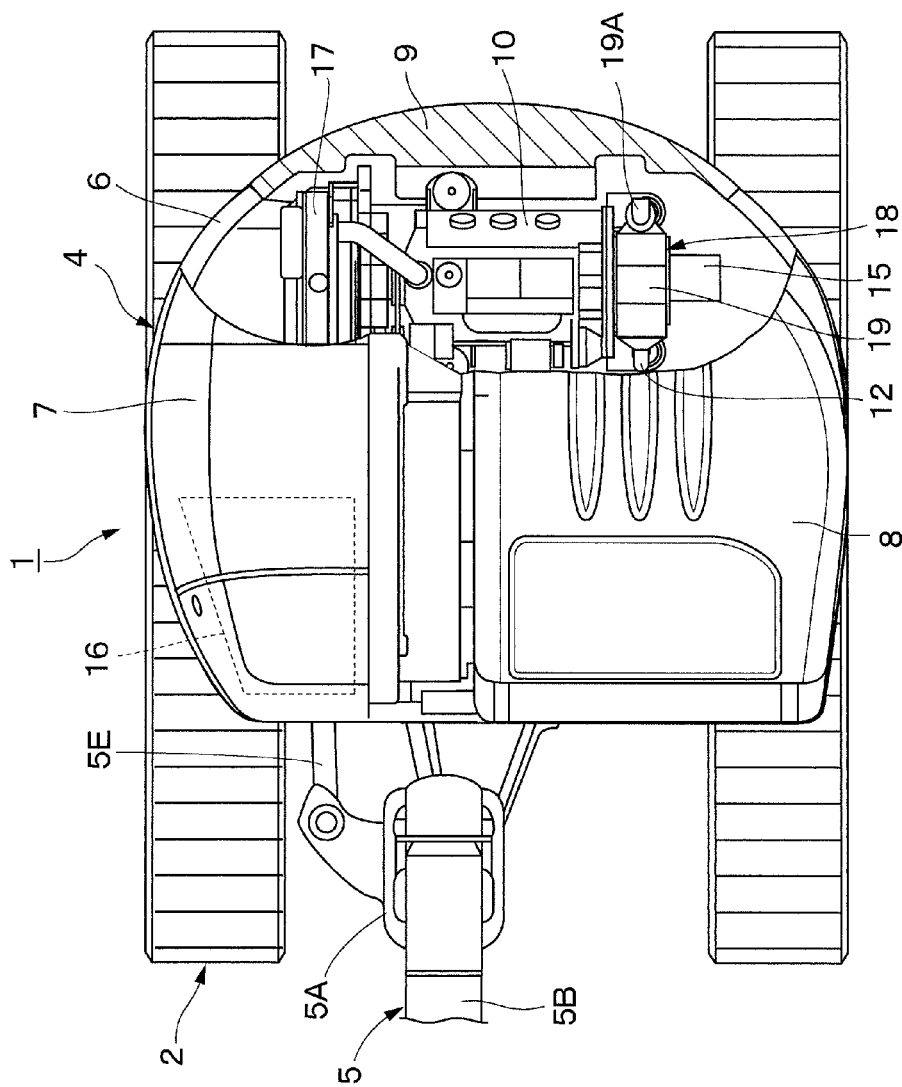
FIG. 2 is a partial cutaway plan view in which the hydraulic excavator is enlarged in a state where a cab and an exterior cover are partially removed from an upper revolving structure in FIG. 1.

The counterweight 9 acts as a weight balance to the working mechanism 5. The counterweight 9 is mounted at the rear end part of the revolving frame 6 to be positioned in the rear side of the engine 10 which will be described later. As shown in FIG. 2, the rear surface side of the counterweight 9 is formed in a circular shape. The counterweight 9 is structured to be accommodated within a vehicle body width of the lower traveling structure 2.

Indicated at 10 is the engine mounted in the rear side of the revolving frame 6 in a transversely placed state. The engine 10 is mounted on the compact hydraulic excavator 1 as a prime mover, and is therefore, configured by a compact diesel engine, for example. The engine 10 is provided with an intake pipe 11 for taking in outside air (refer to FIG. 3) and an exhaust pipe 12 forming a part of an exhaust gas passage for emitting an exhaust gas. Outside air flows in the intake pipe 11 toward the engine 10, and an air cleaner 13 is connected to the intake pipe 11 in a tip end side for purifying the outside air. The exhaust gas purifying device 18 which will be described later is provided to be connected to the exhaust pipe 12.

Here, the engine 10 is configured by an electronically controlled engine, and a supply quantity of fuel thereto is variably controlled by a fuel injection device 14 (refer to FIG. 3) such as an electronically controlled injection valve. That is, the fuel injection device 14 variably controls an injection quantity of fuel injected into cylinders (not shown) of the engine 10 based upon a control signal that is output from a controller 29 which will be described later.

Further, the fuel injection device 14 configures part of a regeneration device 22 together with the controller 29 which will be described later and the like. The fuel injection device 14 performs fuel injection for regeneration treatment, for example, called "post injection" (additional injection after combustion process) in response to a control signal from the controller 29. This post injection increases a temperature of an exhaust gas to burn and remove particulate matter deposited in a particulate matter removing filter 21 in the exhaust gas purifying device 18 which will be described later.

The hydraulic pump 15 is mounted to the left side of the engine 10. The hydraulic pump 15 forms part of a hydraulic source together with an operating oil tank (not shown). The hydraulic pump 15 is driven by the engine 10 to deliver pressurized oil (operating oil) toward control valves (not shown). The hydraulic pump 15 is configured by, for example, a swash plate type, bent axis type or radial piston type hydraulic pump of a variable displacement type. It should be noted that the hydraulic pump 15 is not necessarily limited to the hydraulic pump of a variable displacement type, but may be configured by using a hydraulic pump of a fixed displacement type, for example.

The fuel tank 16 is provided on the revolving frame 6 to be positioned in the right side of the cab 8, and is covered with the exterior cover 7, together with an unillustrated operating oil tank and the like. The fuel tank 16 is formed as, for example, a cuboidal pressure tight tank to reserve therein fuel to be supplied to the engine 10.

The heat exchanger 17 is provided on the revolving frame 6 to be positioned to the right side of the engine 10. The heat exchanger 17 is configured by, for example, a radiator, an oil cooler, and an intercooler. That is, the heat exchanger 17 performs cooling of the engine 10, as well as cooling of pressurized oil (operating oil) that is returned back to the operating oil tank.

Next, an explanation will be made of the exhaust gas purifying device 18 for purifying an exhaust gas emitted from the engine 10.

That is, indicated at 18 is the exhaust gas purifying device that is provided in the exhaust side of the engine 10. As shown in FIG. 2, the exhaust gas purifying device 18 is arranged in the upper part left side of the engine 10 in a position above the hydraulic pump 15, for example, and is connected at the upstream side to the exhaust pipe 12 of the engine 10. The exhaust gas purifying device 18 forms part of an exhaust gas passage together with the exhaust pipe 12, and removes harmful substances contained in an exhaust gas while the exhaust gas flows from the upstream side to the downstream side thereof.

That is, the engine 10 comprising a diesel engine operates in a high efficiency and is excellent in durability, but harmful substances such as particulate matter (PM), nitrogen oxides (NOx), and carbon monoxides (CO) are contained in the exhaust gas from the engine 10. Therefore, as shown in FIG. 3, the exhaust gas purifying device 18 mounted on the exhaust pipe 12 is configured to include the oxidation catalyst 20, which will be described later, for oxidizing and removing carbon monoxides (CO) and the like in the exhaust gas and the particulate matter removing filter 21, which will be described later, for trapping and removing particulate matter (PM) in the exhaust gas.

Figure 3:
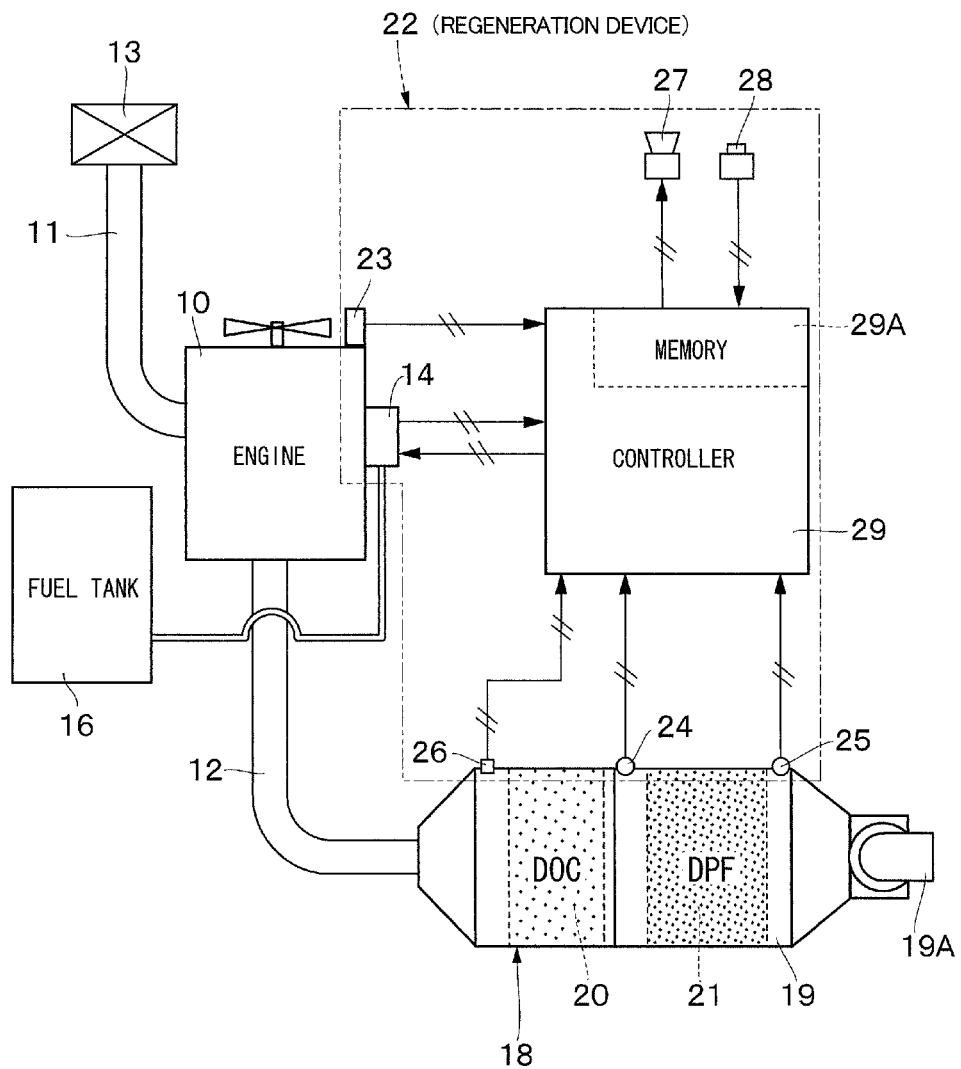

As shown in FIG. 3, the exhaust gas purifying device 18 is provided with a cylindrical casing 19 configured by removably connecting a plurality of cylinders before and after. The oxidation catalyst 20 called "DOC" and the particulate matter removing filter 21 called "DPF" (hereinafter referred to as "filter 21") are removably accommodated in the casing 19. An outlet port 19A is positioned downstream of the filter 21 to be connected to an outlet side of the casing 19. The outlet port 19A is structured to include a chimney for emitting the exhaust gas having subjected to the purification treatment to an atmosphere, and a muffler.

The oxidation catalyst 20 comprises a cell-shaped cylinder made of ceramic having an outer diameter dimension that is equivalent to an inner diameter dimension of the casing 19, for example. Many through holes (not shown) are axially formed in the oxidation catalyst 20, and an inner surface of the through hole is coated with a noble metal. The oxidation catalyst 20 oxidizes and removes carbon monoxides (CO), hydrocarbon (HC), and the like contained in the exhaust gas by circulating an exhaust gas into each through hole under a predetermined temperature condition, for example, removes nitrogen oxides (NO) as nitrogen dioxides ($NO_2$).

On the other hand, the filter 21 is arranged downstream of the oxidation catalyst 20 in the casing 19. The filter 21 traps particulate matter in the exhaust gas emitted from the engine 10, and burns and removes the trapped particulate matter to perform purification of the exhaust gas. Therefore, the filter 21 is configured by a cell-shaped cylinder, for example, made of a ceramic material, which is a porous member having many small bores (not shown) in an axial direction. Thereby, the filter 21 traps particulate matter through many small bores, and the trapped particulate matter is burned and removed by regeneration treatment of the regeneration device 22 which will be described later. As a result, the filter 21 is regenerated.

Next, an explanation will be made of the regeneration device 22 for executing the regeneration treatment of the filter 21.

That is, denoted at 22 is the regeneration device for executing the regeneration treatment of the filter 21 by burning the particulate matter trapped in the filter 21 in the exhaust gas purifying device 18. The regeneration device 22 is configured by including the aforementioned fuel injection device 14, and a rotational sensor 23, pressure sensors 24 and 25, an exhaust gas temperature sensor 26, the alarming device 27, the manual regeneration switch 28 and the controller 29, which will be described later. The regeneration device 22 performs post injection by the fuel injection device 14 in response to a command signal (control signal) of the controller 29. This post injection, as described later, increases a temperature of an exhaust gas in the exhaust pipe 12 to burn and remove the particulate matter deposited in the filter 21.

Here, the regeneration device 22 has an automatic regeneration function of automatically executing the regeneration treatment based upon determination of the controller 29, that is, not based upon an operation of an operator, and a manual regeneration function of giving an operator an alarm to manually execute the regeneration treatment based upon the determination of the controller 29 to execute the regeneration treatment based upon an operation of the operator. Further, in a case where it is determined by the controller 29 that the particulate matter is excessively deposited in the filter 21, the regeneration device 22 also includes an excessive deposit alarming function of giving the operator the alarm of the determination.

The rotational sensor 23 detects a rotational speed N of the engine 10, and the rotational sensor 23 detects a rotational speed N of the engine 10 and outputs the detection signal to the controller 29 which will be described later. The controller 29 estimates a trapping quantity of the particulate matter trapped in the filter 21 based upon an engine rotational speed N detected by the rotational sensor 23, a fuel injection quantity F injected by the fuel injection device 14, and an exhaust gas temperature GT detected by the exhaust gas temperature sensor 26 which will be described later, and determines whether or not the regeneration treatment is executed based upon a second estimated trapping quantity H2 which is the estimated trapping quantity. It should be noted that the fuel injection quantity F can be found, for example, from an intake air quantity detected from the air flow meter (not shown) provided in the intake side of the engine 10 and an engine rotational speed N, and besides, can be calculated also from a control signal (fuel injection command) that is output to the fuel injection device 14 from the controller 29, for example.

The pressure sensors 24 and 25 are provided in the casing 19 in the exhaust gas purifying device 18. As shown in FIG. 3, the pressure sensors 24 and 25 are arranged respectively in an inlet side (upstream side) and in an outlet side (downstream side) of the filter 21 to be spaced from each other, and output the respective detection signals to the controller 29 which will be described later. The controller 29 calculates a differential pressure $\Delta P$ between pressure P1 in the inlet side detected by the pressure sensor 24 and pressure P2 in the outlet side detected by the pressure sensor 25, and estimates a trapping quantity of the particulate matter trapped in the filter 21 based upon the differential pressure $\Delta P$, an exhaust gas temperature GT and an exhaust gas flow quantity, and determines whether or not the regeneration treatment is executed based upon a first estimated trapping quantity H1 that is the estimated trapping quantity.

The exhaust gas temperature sensor 26 detects an exhaust gas temperature (exhaust temperature) GT. As shown in FIG. 3, the exhaust gas temperature sensor 26 is mounted to the casing 19 in the exhaust gas purifying device 18, and detects a temperature GT of an exhaust gas discharged from the exhaust pipe 12 side, for example. The exhaust gas temperature GT detected by the exhaust gas temperature sensor 26 is output to the controller 29, which will be described later, as a detection signal. The exhaust gas temperature GT is used for estimating a trapping quantity of the particulate matter trapped in the filter 21.

The alarming device 27 is provided near an operator's seat in the cab 8. The alarming device 27 is connected to the controller 29, and has a function of giving an alarm of the following content to an operator, based upon a command (alarm signal) from the controller 29. That is, the alarming device 27 has a first function of giving an operator an alarm to execute manual regeneration treatment and a second function of alarming that the particulate matter is excessively deposited in the filter 21.

Here, the alarming device 27 may be configured by a buzzer for generating alarm sounds, a speaker for generating sounds, a luminous device for displaying an alarm content by light or a monitor for displaying an alarm content by a screen, or the like. The alarming device 27, in a case where the controller 29 determines that it is necessary to execute the manual regeneration treatment and that the particulate matter is excessively deposited in the filter 21, informs an operator of the determination result based upon a command (an alarm signal) from the controller 29.

The manual regeneration switch 28 is provided near an operator's seat in the cab 8. The manual regeneration switch 28 is connected to the controller 29 which will be described later, and outputs a signal of executing the manual regeneration to the controller 29 based upon an operation of the operator. That is, when the operator operates the manual regeneration switch 28 by the alarm of the manual regeneration from the alarming device 27, a signal that the switch is operated is output to the controller 29 from the manual regeneration switch 28. As a result, the controller 29 outputs a command (control signal) of executing the regeneration treatment (post injection) to the fuel injection device 14. Therefore, the operator can execute the manual regeneration treatment.

The controller 29 comprises a microcomputer and the like, and the controller 29 is connected at the input side to the fuel injection device 14, the rotational sensor 23, the pressure sensors 24 and 25, the exhaust gas temperature sensor 26, the manual regeneration switch 28, the unillustrated air flow meter, and the like. The controller 29 is connected at the output side to the fuel injection device 14, the alarming device 27 and the like. The controller 29 has a memory 29A comprising a ROM, a RAM and the like, and process programs for regeneration treatment shown in FIG. 6 to FIG. 8 which will be described later, a first map and a second map in advance produced for estimating a trapping quantity of particulate matter, calculation formula, and an automatic regeneration threshold value T1, a manual regeneration threshold value T2 and an excessive deposit threshold value T3, which are in advance set and shown in FIG. 4 and FIG. 5, and the like are stored in the memory 29A.

Here, the first map is a map for estimating a trapping quantity based upon a differential pressure $\Delta P$ across the filter 21. Specifically, the first map is a map that is produced based upon, for example, a corresponding relation between a differential pressure $\Delta P$, a flow quantity of an exhaust gas and a first estimated trapping quantity H1, which is in advance found by experiments, calculations, simulations, and the like. It should be noted that the flow quantity of the exhaust gas can be found from, for example, an engine rotational speed N and a fuel injection quantity F. The differential pressure $\Delta P$ across the filter 21 can be calculated according to the following formula 1 in a case where pressure in the inlet side detected by the pressure sensor 24 is indicated at P1 and pressure in the outlet side detected by the pressure sensor 25 is indicated at P2.

$$\Delta P = P1 - P2 \quad \text{[Formula 1]}$$

On the other hand, the second map is a map for finding an emission quantity Hm of particulate matter emitted from the engine 10 based upon a rotational speed N of the engine 10 and a fuel injection quantity F. Specifically, the second map is a map that is produced based upon, for example, a corresponding relation between an engine rotational speed N, a fuel injection quantity F and an emission quantity Hm of particulate matter, which is in advance found by experiments, calculations, simulations, and the like. The calculation formula for estimating the trapping quantity can be expressed according to the following formula 2 in a case where a second estimated trapping quantity is indicated at H2, an emission quantity of the particulate matter found by the second map is indicated at Hm and a quantity (regeneration quantity) of particulate matter removed from the filter 21 by the regeneration treatment is indicated at J.

$$H2 = Hm - J \quad \text{[Formula 2]}$$

In this case, the quantity of the particulate matter removed by the regeneration treatment, that is, the regeneration quantity J can be calculated from, for example, a relation between a flow quantity of an exhaust gas found by an engine rotational speed N and a fuel injection quantity F, an exhaust gas temperature GT, and a $NO_2$ conversion rate found by adding an exhaust gas temperature GT to an emission quantity of nitrogen oxides (NOx) found by an engine rotational speed N and a fuel injection quantity F.

Figure 4:
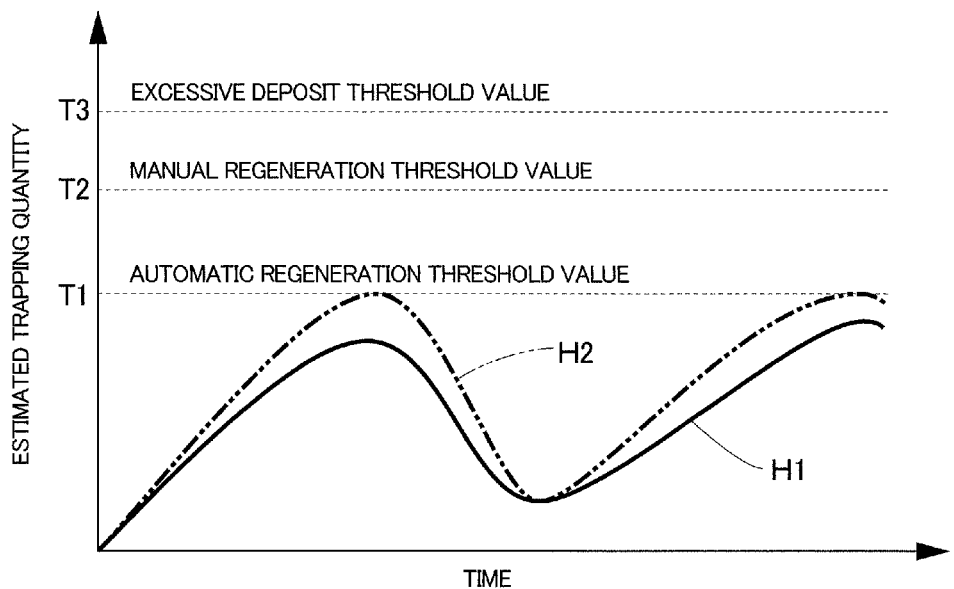
FIG. 4 is a characteristic line diagram showing an example of a change of a first estimated trapping quantity H1 and a second estimated trapping quantity H2 with time.

Next, by referring to FIG. 4, the automatic regeneration threshold value T1 is a threshold value of an estimated trapping quantity for determining whether or not the automatic regeneration treatment is executed. That is, the automatic regeneration threshold value T1 is a determination value for determining that the automatic regeneration treatment is necessary when a first estimated trapping quantity H1 estimated by the aforementioned first map and/or a second estimated trapping quantity H2 estimated by the aforementioned second map and calculation formula becomes equal to or more than the automatic regeneration threshold value T1.

On the other hand, the manual regeneration threshold value T2 is a threshold value of an estimated trapping quantity for determining whether or not the manual regeneration treatment is executed. That is, the manual regeneration threshold value T2 is a determination value for determining that the manual regeneration treatment is necessary when a first estimated trapping quantity H1 estimated by the aforementioned first map and/or a second estimated trapping quantity H2 estimated by the aforementioned second map and calculation formula becomes equal to or more than the manual regeneration threshold value T2. In this case, the manual regeneration threshold value T2 is set to a larger value than the automatic regeneration threshold value T1.

Further, the excessive deposit threshold value T3 is a threshold value of an estimated trapping quantity for determining whether or not the particulate matter is excessively deposited in the filter 21. Specifically, the excessive deposit threshold value T3 is a threshold value set as a boundary value in which the filter 21 is melted and damaged when the regeneration treatment is executed by a trapping quantity larger than a value of the excessive deposit threshold value T3. The excessive deposit threshold value T3 is a determination value for determining that the regeneration treatment cannot be executed because of excessive deposit of the particulate matter when a first estimated trapping quantity H1 estimated by the aforementioned first map and/or a second estimated trapping quantity H2 estimated by the aforementioned second map and calculation formula becomes equal to or more than the excessive deposit threshold value T3. In this case, the excessive deposit threshold value T3 is set to a larger value than each of the manual regeneration threshold value T2 and the automatic regeneration threshold value T1.

The controller 29 performs control of automatic regeneration treatment for automatically executing regeneration treatment not based upon an operation of an operator and control of manual regeneration treatment for executing regeneration treatment based upon an operation of an operator by giving the operator an alarm to manually execute the regeneration treatment, according to process programs in FIG. 6 and FIG. 8 which will be described later. Further, in a case where it is determined that the particulate matter is excessively deposited in the filter 21, the controller 29 gives an operator an alarm of the determination to perform control of an excessive deposit alarming process for prompting the operator to perform inspection, maintenance, repair, replacement or the like.

That is, the controller 29 estimates a trapping quantity of particulate matter trapped in the filter 21 based upon at least a differential pressure $\Delta P$ across the filter 21 (first calculating unit). In addition thereto, the controller 29 estimates a trapping quantity of particulate matter trapped in the filter 21 based upon at least an engine rotational speed N, a fuel injection quantity F, and an exhaust gas temperature GT (second calculating unit). The controller 29 determines whether or not the regeneration treatment in the filter 21 is executed using the two estimated trapping quantities, that is, the first estimated trapping quantity H1 and the second estimated trapping quantity H2 (regeneration determining unit).

Specifically, it is determined whether or not the automatic regeneration treatment is executed based upon whether or not at least one of the first estimated trapping quantity H1 and the second estimated trapping quantity H2 is equal to or more than the automatic regeneration threshold value T1 (automatic regeneration treatment determination). When it is determined that the automatic regeneration treatment is necessary, the controller 29 outputs, for example, a control signal of performing post injection to the fuel injection device 14 to perform control of the automatic regeneration treatment for automatically executing the automatic regeneration treatment without the operation of the operator.

The controller 29 determines whether or not the manual regeneration treatment is executed based upon whether or not at least one of the first estimated trapping quantity H1 and the second estimated trapping quantity H2 is equal to or more than the manual regeneration threshold value T2 (manual regeneration treatment determination). When it is determined that the manual regeneration treatment is necessary, the controller 29 outputs an alarm signal to the alarming device 27 for an operator to manually execute the regeneration treatment. As a result, the alarming device 27 performs generation of alarm sounds and an alarm display. In this case, the operator operates the manual regeneration switch 28, and the controller 29 performs the control of the manual regeneration treatment to execute the regeneration treatment on a condition of the operation of the operator.

Further, the controller 29 determines whether or not the particulate matter is excessively deposited in the filter 21 based upon whether or not at least one of the first estimated trapping quantity H1 and the second estimated trapping quantity H2 is equal to or more than the excessive deposit threshold value T3 (excessive deposit determination). When it is determined that the particulate matter is excessively deposited, the controller 29 outputs a signal (an alarm signal) for alarming the excessive deposit to an operator to the alarming device 27. Therefore, the alarming device 27 performs generation of alarm sounds and an alarm display. In this case, the controller 29 continues to perform the alarm until necessary inspection, maintenance, repair, replacement, or the like is performed, and performs control of the excessive deposit alarming process for prohibiting the regeneration treatment. As a result, since the operator can recognize that the particulate matter is excessively deposited in the filter 21, the operator informs a maintenance worker in a maintenance factory of the excessive deposit. Accordingly, the maintenance worker can perform necessary inspection, maintenance, repair, replacement or the like.

Incidentally, in an operating state where the rotational speed of the engine 10 is low, that is, in a low rotational condition, an exhaust flow quantity from the engine 10 becomes small to cause the differential pressure between the inlet side and the outlet side of the filter 21 to be small, and pulsation of the differential pressure is more likely to be unstable. Therefore, when the engine 10 is in the low rotational condition, it is difficult to secure the estimation accuracy of the first estimated trapping quantity H1.

Figure 5:
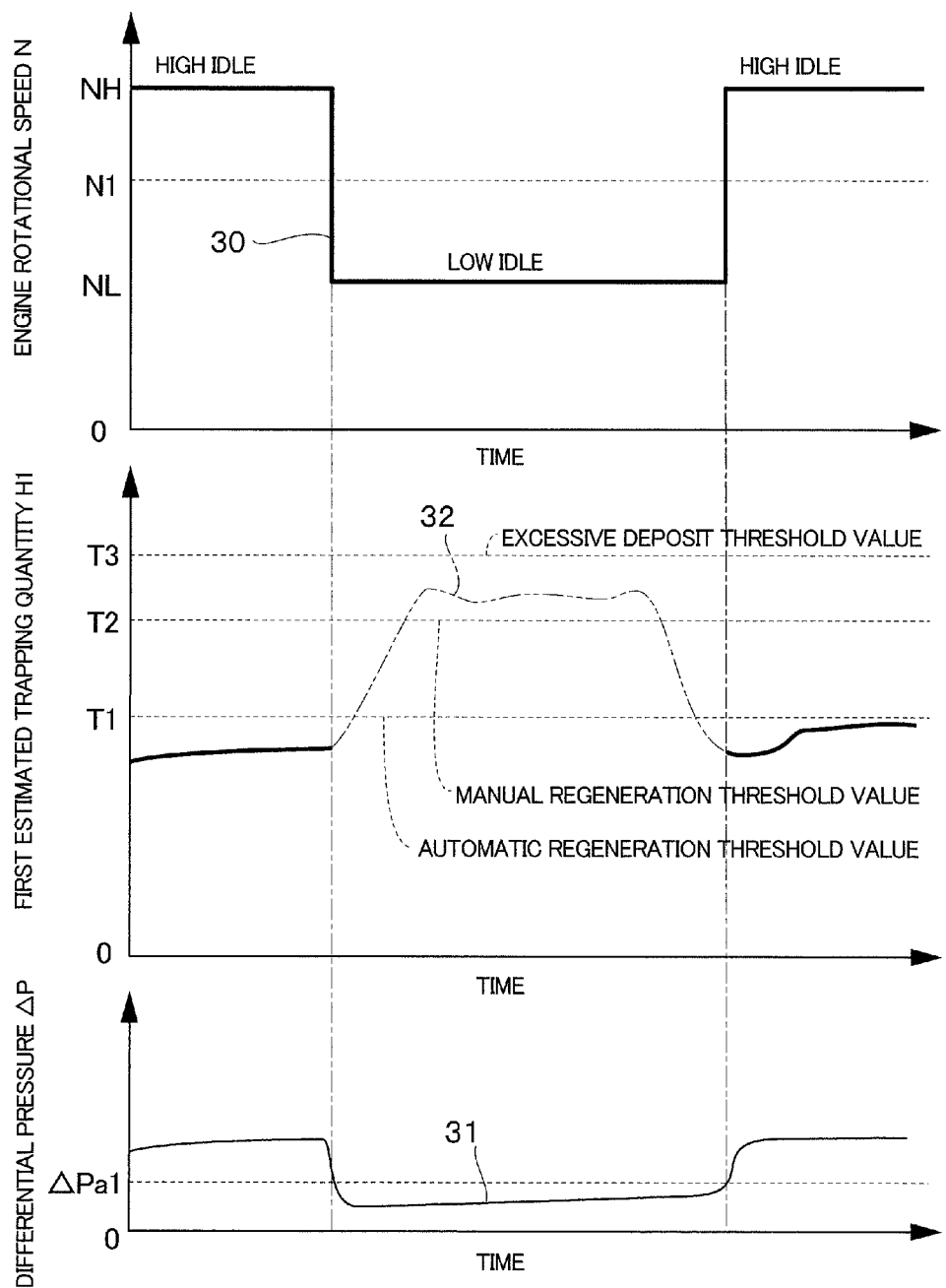
FIG. 5 is a characteristic line diagram showing an example of a change of an engine rotational speed N, a first estimated trapping quantity H1 and a differential pressure $\Delta P$ with time.

For example, in FIG. 5 a characteristic line 30 indicates a change in engine rotational speed N with time. As in the case of the characteristic line 30, in a case where the operating state of the engine 10 changes from a high idling condition of a high rotational speed to a low idling state of a low rotational speed, the exhaust flow quantity from the engine 10 becomes small. In FIG. 5, a characteristic line 31 indicates a change in differential pressure $\Delta P$ with time. As in the case of the characteristic line 31, the differential pressure $\Delta P$ across the filter 21 becomes small to be below $\Delta Pa1$, for example, when the engine 10 changes into the low idling state. The first estimated trapping quantity H1 largely changes by a combination of the smaller exhaust flow quantity and the smaller differential pressure $\Delta P$. In FIG. 5, a characteristic line 32 of a dashed-two dotted line indicates a first estimated trapping quantity H1 when the differential pressure $\Delta P$ becomes smaller than $\Delta Pa1$. When the differential pressure $\Delta P$ becomes smaller than $\Delta Pa1$ as in the case of the characteristic line 32, the first estimated trapping quantity H1 is possibly estimated as an excessive value.

Therefore, in the first embodiment, the controller 29, when the engine 10 is in a predetermined low rotational condition, that is, in a case where the differential pressure $\Delta P$ becomes equal to or less than a predetermined value $\Delta Pa1$, is configured to perform the determination using only the second estimated trapping quantity (H2). That is, in a case where the differential pressure $\Delta P$ becomes equal to or less than the predetermined value $\Delta Pa1$, the controller 29 is configured to have a low-rotational time processing unit for performing the determination only using the second estimated trapping quantity H2 without using the first estimated trapping quantity (H1). More specifically, the controller 29 performs an automatic regeneration treatment determination that determines whether or not the regeneration treatment is automatically executed, a manual regeneration treatment determination that determines whether or not an alarm of manually executing the regeneration treatment is given to an operator and an excessive deposit determination that determines whether or not the particulate matter is excessively deposited in the filter 21 using only the second estimated trapping quantity (H2) without using the first estimated trapping quantity (H1) when the differential pressure $\Delta P$ becomes equal to or less than the predetermined value $\Delta Pa1$. The regeneration treatment shown in FIG. 6 to FIG. 8 including the process executed in the low rotational condition that is executed by the controller 29 will be described later.

The hydraulic excavator 1 according to the first embodiment has the configuration as described above, and, next, an operation thereof will be explained.

An operator of the hydraulic excavator 1 gets on the cab 8 of the upper revolving structure 4, and starts the engine 10 to drive the hydraulic pump 15. Thereby, pressurized oil from the hydraulic pump 15 is supplied through control valves to various actuators. When the operator having got on the cab 8 operates an operating lever for traveling, the lower traveling structure 2 can go forward or backward.

On the other hand, when the operator in the cab 8 operates an operating lever for working, the working mechanism 5 can tiltably perform an excavating work of sand and earth or the like. In this case, the compact hydraulic excavator 1, because of a small revolving radius thereof by the upper revolving structure 4, can perform a ditch digging work and the like while revolving the upper revolving structure 4 even in a narrow working site such as an urban area.

At the operating of the engine 10, the particulate matter that is harmful substances is discharged from the exhaust pipe 12. At this time, the exhaust gas purifying device 18 can oxidize and remove hydrocarbon (HC), nitrogen oxides (NOx), and carbon monoxides (CO) in an exhaust gas by the oxidation catalyst 20. The filter 21 traps the particulate matter contained in the exhaust gas. Thereby, the purified exhaust gas can be discharged through the downstream outlet port 19A to an outside. Further, the trapped particulate matter is burned and removed by the regeneration device 22 to regenerate the filter 21.

Next, the regeneration treatment executed by the regeneration device 22 will be explained with reference to the flow charts in FIG. 6 to FIG. 8. It should be noted that the process in FIG. 6 to FIG. 8 is repeatedly executed every predetermined control time (by a predetermined sampling frequency) by the controller 29 while the power is supplied to the controller 29.

The controller 29 is activated by power supply of an accessory or by start of the engine 10 (ignition-on). When the process operation in FIG. 6 starts, pressures P1 and P2 are respectively read in from the pressure sensors 24 and 25 at step 1. That is, the upstream pressure P1 and the downstream pressure P2 across the filter 21 are read in. At the next step 2, a differential pressure $\Delta P$ between the upstream pressure P1 and the downstream pressure P2 across the filter 21 is calculated from the aforementioned formula 1.

At the next step 3, a trapping quantity of particulate matter trapped in the filter 21, that is, a first estimated trapping quantity H1 is estimated (calculated) based upon the differential pressure $\Delta P$. The first estimated trapping quantity H1 can be estimated using the aforementioned first map stored in the memory 29A in the controller 29. The first estimated trapping quantity H1 at the present point in time can be estimated based upon the first map in which a differential pressure $\Delta P$, an exhaust gas flow quantity and an estimated trapping quantity H1 are associated.

At the next step 4, an engine rotational speed N is read in from the rotational sensor 23. At step 5, a fuel injection quantity F injected from the fuel injection device 14 is read in. It should be noted that the fuel injection quantity F can be found by, for example, an intake air quantity detected from the air flow meter (not shown) that is provided in the intake side of the engine 10 and an engine rotational speed N, and besides, can also be calculated from, for example, a control signal (fuel injection command) that is output to the fuel injection device 14 from the controller 29. At step 6, an exhaust gas temperature GT is read in from the exhaust gas temperature sensor 26.

At step 7, a trapping quantity of particulate matter trapped in the filter 21, that is, a second estimated trapping quantity H2 is estimated (calculated) based upon an engine rotational speed N, a fuel injection quantity F, and an exhaust gas temperature GT. The second estimated trapping quantity H2 can be estimated using the second map and the calculation formula stored in the memory 29A in the controller 29.

That is, an emission quantity per unit time is found using the aforementioned second map from the engine rotational speed N and the fuel injection quantity F, and a total emission quantity Hm from the operating start point to the present point in time is found by integrating the emission quantities. Specifically, the second estimated trapping quantity H2 at the present point in time can be estimated by subtracting the quantity (regeneration quantity) J of the particulate matter that has been removed by the regeneration treatment until the present point in time from the total emission quantity Hm, based upon the aforementioned formula 2.

At the next step 8, it is determined whether or not the engine 10 is in a low rotational condition. That is, as shown in FIG. 5, in a case where it is determined that the engine 10 is in the low rotational condition, the first estimated trapping quantity H1 is possibly estimated (calculated) as an excessive value to an actual trapping quantity by a combination of the smaller exhaust flow quantity and the smaller differential pressure $\Delta P$. Therefore, at step 8, it is determined whether or not the first estimated trapping quantity H1 by the first calculating unit may be used (whether the first estimated trapping quantity H1 is made effective or ineffective). In this case, whether or not the engine is in a low rotational condition (whether the first estimated trapping quantity H1 is made effective or ineffective) is determined by a differential pressure $\Delta P$ across the filter 21. Specifically, at step 8, it is determined whether or not the differential pressure $\Delta P$ across the filter 21 is larger than a predetermined value $\Delta Pa1$.

It should be noted that the predetermined value $\Delta Pa1$ is a boundary value for determining whether or not the engine 10 is in a predetermined low rotational condition. That is, when the rotational speed N of the engine 10 becomes lower, in a case where the rotational speed of the engine 10 that cannot allow for a degradation in accuracy of the first estimated trapping quantity H1 is indicated at N1, the boundary value is set as the value $\Delta Pa1$ of the differential pressure corresponding to this rotational speed N1. The predetermined value $\Delta Pa1$ is in advance found by experiments, calculations, simulations or the like to be stored in the memory 29A of the controller 29 such that it becomes a boundary value (determination value) for being capable of suppressing unnecessary regeneration treatment (the automatic regeneration treatment, the manual regeneration treatment and the alarm of the excessive deposit) due to the degradation in accuracy of the first estimated trapping quantity H1.

In a case where the determination of "YES" is made at step 8, that is, it is determined that the differential pressure $\Delta P$ across the filter 21 is larger than the predetermined value $\Delta Pa1$ (the engine is not in the low rotational condition), the first estimated trapping quantity H1 by the first calculating unit can be made effective to make a determination of the regeneration treatment. Then, the process goes to step 9, wherein the process of using both the first estimated trapping quantity H1 and the second estimated trapping quantity H2 is executed.

In the process at step 9, as shown in FIG. 7, it is determined whether or not the automatic regeneration treatment is executed, based upon a determination at step 11 on whether or not the first estimated trapping quantity H1 and/or the second estimated trapping quantity H2 is equal to or more than a preset automatic regeneration threshold value T1. In a case where the determination of "NO" is made at step 11, that is, it is determined that each of the first estimated trapping quantity H1 and the second estimated trapping quantity H2 is smaller than the automatic regeneration threshold value T1, it is assumed that the particulate matter is not trapped in the filter 21 to the extent of requiring the regeneration treatment (the filter 21 is not clogged). In this case, the process goes back to Start in FIG. 6 via Return in FIG. 7 and Return in FIG. 6 to repeat the process from step 1.

On the other hand, in a case where the determination of "YES" is made at step 11, that is, it is determined that at least one of the first estimated trapping quantity H1 and the second estimated trapping quantity H2 is equal to or more than the automatic regeneration threshold value T1, it is assumed that the particulate matter is trapped in the filter 21 to the extent or more than the extent of requiring the regeneration treatment. Therefore, the process goes to step 12, wherein it is determined whether or not the manual regeneration treatment is executed. That is, it is determined whether or not the manual regeneration treatment is executed, based upon whether or not the first estimated trapping quantity H1 and/or the second estimated trapping quantity H2 is equal to or more than a preset manual regeneration threshold value T2.

In a case where the determination of "NO" is made at step 12, that is, it is determined that each of the first estimated trapping quantity H1 and the second estimated trapping quantity H2 is smaller than the manual regeneration threshold value T2, it is assumed that the particulate matter is not trapped in the filter 21 to the extent of requiring the regeneration treatment. In this case, the process goes to step 13, wherein the automatic regeneration treatment starts. That is, at step 13, the controller 29 outputs a control signal of performing post injection to the fuel injection device 14. As a result, a temperature of an exhaust gas from the engine 10 is increased to burn and remove the particulate matter trapped (deposited) in the filter 21.

Next, at step 14, it is determined whether or not the automatic regeneration treatment is finished, that is, whether or not the particulate matter in the filter 21 is sufficiently burned and removed. This determination can be made based upon, for example, whether or not the quantity of the particulate matter in the filter 21 is equal to or less than a predetermined value. At step 14, the automatic regeneration treatment continues to be executed until the quantity of the particulate matter in the filter 21 is equal to or less than the predetermined value (the post injection continues to be performed). The predetermined value is in advance found by experiments, calculations, simulations or the like) to be stored in the memory 29A of the controller 29 such that it becomes a boundary value (determination value) for a determination on whether or not the particulate matter in the filter 21 is sufficiently small. It can be determined whether or not the particulate matter in the filter 21 is equal to or less than the predetermined value, for example, based upon the first estimated trapping quantity H1 estimated by the first calculating unit and/or the second estimated trapping quantity H2 estimated by the second calculating unit. When the determination of "YES" is made at step 14, that is, when the particulate matter in the filter 21 is equal to or less than the predetermined value, the automatic regeneration treatment is finished (the post injection is finished), and the process goes back to Start in FIG. 6 via Return in FIG. 7 and Return in FIG. 6, and the process from step 1 is repeated.

On the other hand, in a case where the determination of "YES" is made at step 12, that is, it is determined that at least one of the first estimated trapping quantity H1 and the second estimated trapping quantity H2 is equal to or more than the manual regeneration threshold value T2, it is assumed that the particulate matter is trapped in the filter 21 to the extent or more than the extent of requiring the regeneration treatment. Therefore, in this case, the process goes to step 15, wherein it is determined whether or not the particulate matter is excessively deposited in the filter 21. That is, it is determined whether or not there is an excessive deposit defect, based upon whether or not the first estimated trapping quantity H1 and/or the second estimated trapping quantity H2 is equal to or more than a preset excessive deposit threshold value T3.

In a case where the determination of "NO" is made at step 15, that is, it is determined that each of the first estimated trapping quantity H1 and the second estimated trapping quantity H2 is smaller than the excessive deposit threshold value T3, it is assumed that the particulate matter is not excessively deposited in the filter 21. In this case, the process goes to step 16, wherein the manual regeneration treatment starts. That is, at step 16, an alarm signal is output to the alarming device 27 from the controller 29 to give an operator an alarm to manually execute the regeneration treatment.

At the next step 17, it is determined whether or not the manual regeneration treatment is finished. This determination is performed in such a manner that an operator operates the manual regeneration switch 28, and based upon this operation, it is determined whether or not a control signal of performing post injection is output to the fuel injection device 14 from the controller 29. Together therewith, for example, it is determined whether or not the quantity of the particulate matter in the filter 21 is equal to or less than a predetermined value. At step 17, the manual regeneration treatment continues to be executed until the quantity of the particulate matter in the filter 21 is equal to or less than the predetermined value (the post injection continues to be performed). The predetermined value is in advance found by experiments, calculations, simulations or the like to be stored in the memory 29A of the controller 29 such that it becomes a boundary value (determination value) for a determination on whether or not the particulate matter in the filter 21 is sufficiently small. It can be determined whether or not the particulate matter in the filter 21 is equal to or less than the predetermined value, based upon the first estimated trapping quantity H1 estimated by the first calculating unit and/or the second estimated trapping quantity H2 estimated by the second calculating unit. When the determination of "YES" is made at step 17, that is, when the quantity of the particulate matter in the filter 21 is equal to or less than the predetermined value, the manual regeneration treatment is finished (the post injection is finished), and the process goes back to Start in FIG. 6 via Return in FIG. 7 and Return in FIG. 6, and the process from step 1 is repeated.

On the other hand, in a case where the determination of "YES" is made at step 15, that is, it is determined that at least one of the first estimated trapping quantity H1 and the second estimated trapping quantity H2 is equal to or more than the excessive deposit threshold value T3, it is assumed that when the regeneration treatment is executed, the particulate matter is trapped to the extent that the filter 21 is melted and damaged. Therefore, in this case, the process goes to step 18, wherein an alarm signal is output to the alarming device 27 from the controller 29 to give an operator an alarm of the excessive deposit defect. Next, the process goes to step 19, wherein the alarm of the excessive deposit defect is given until necessary inspection, maintenance, repair, replacement or the like is performed, and the regeneration treatment is prohibited. When it is determined that the necessary inspection, maintenance, repair, replacement or the like is performed at step 19, the process goes back to Start in FIG. 6 via Return in FIG. 7 and Return in FIG. 6, and the process from step 1 is repeated.

Figure 6:
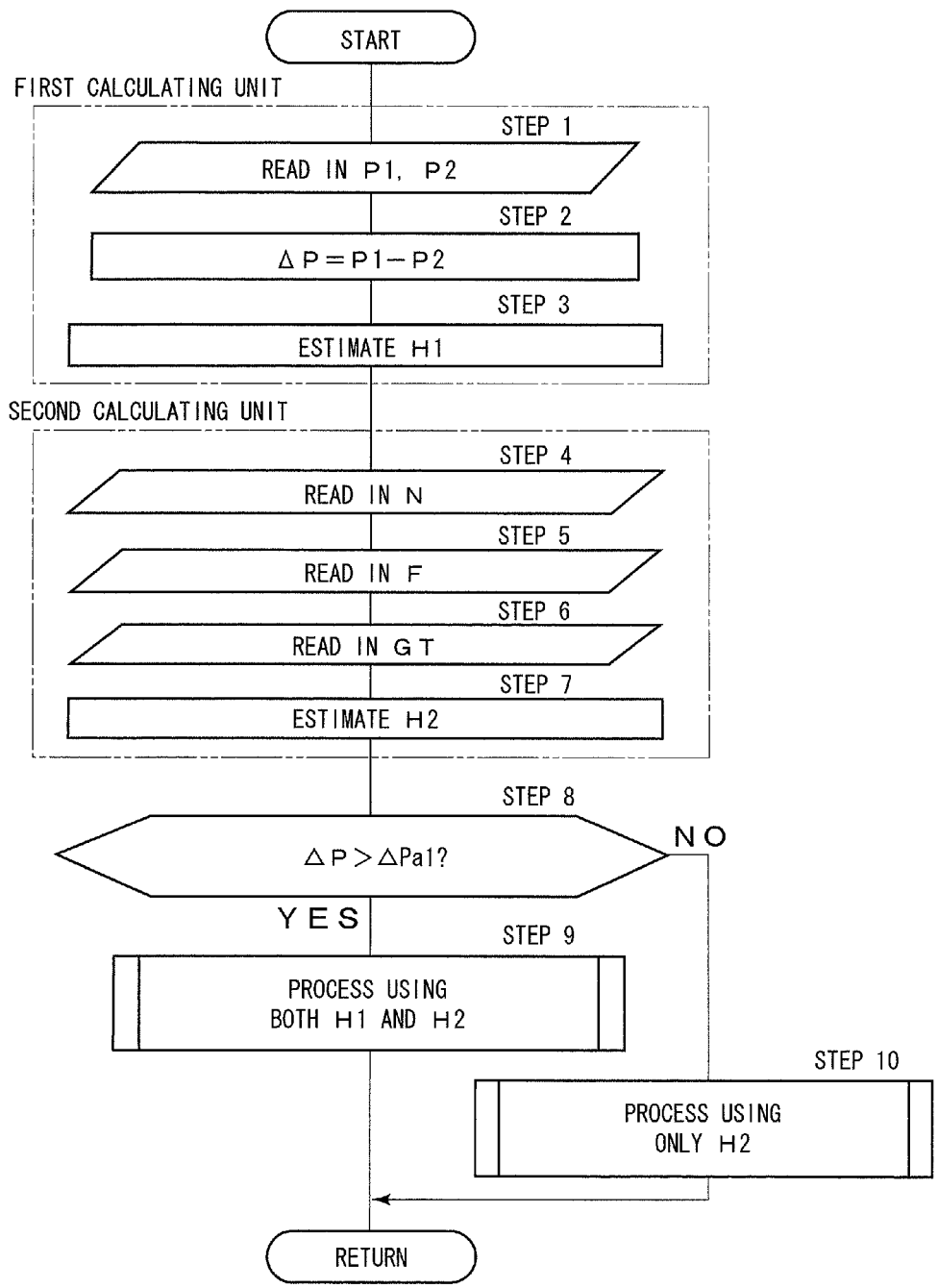
FIG. 6 is a flow chart showing regeneration treatment of a filter by the regeneration device.
Figure 7:
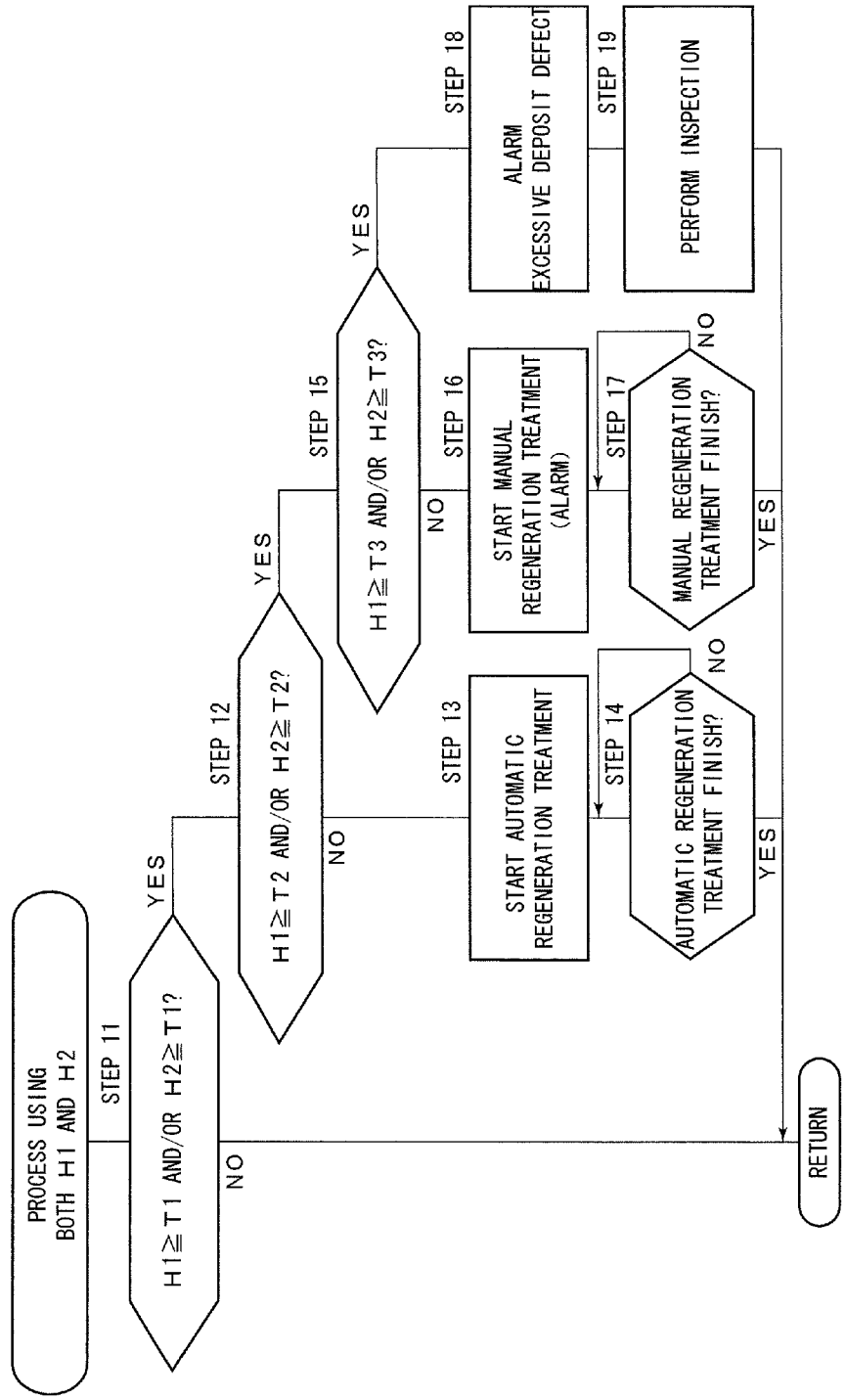
FIG. 7 is a flow chart showing "a process using both a first estimated trapping quantity H1 and a second estimated trapping quantity H2" in step 9 in FIG. 6.

On the other hand, in a case where the determination of "NO" is made at step 8 in FIG. 6, that is, it is determined that the differential pressure ΔP across the filter 21 is equal to or less than the predetermined value ΔPa1 (the engine is in the low rotational condition), the first estimated trapping quantity H1 by the first calculating unit is made ineffective to make a determination of the regeneration treatment. In this case, the process goes to step 10, wherein the process of using only the second estimated trapping quantity H2 is executed.

Figure 8:
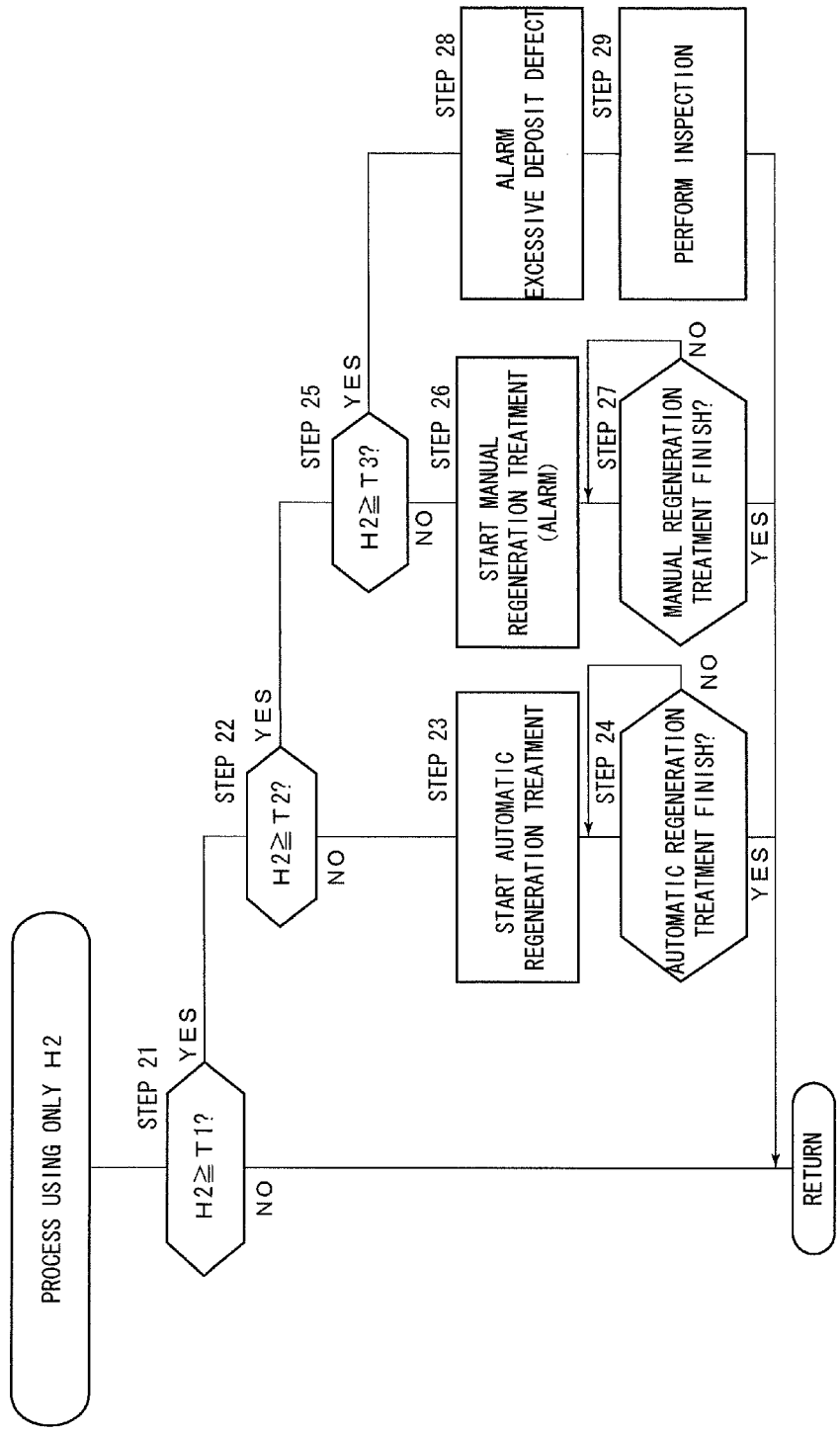
FIG. 8 is a flow chart showing "a process using only a second estimated trapping quantity H2" in step 10 in FIG. 6.

The process of this step 10 is the process comprising step 21 to step 29 shown in FIG. 8. In the process shown in FIG. 7 as described above, the determination of the automatic regeneration treatment (step 11), the determination of the manual regeneration treatment (step 12), and the determination of the excessive deposit (step 15) are performed using both of the first estimated trapping quantity H1 and the second estimated trapping quantity H2. On the other hand, in the process shown in FIG. 8, the determination of the automatic regeneration treatment (step 21), the determination of the manual regeneration treatment (step 22), and the determination of the excessive deposit (step 25) are performed using only the second estimated trapping quantity H2. Since the process comprising step 21 to step 29 shown in FIG. 8 is the same as the process comprising step 11 to step 19 shown in FIG. 7 except for the difference of this respect, the further explanation is omitted.

Thus, according to the first embodiment, in a case where at the process of step 8 the engine 10 is in the predetermined low rotational condition, that is, in a case where it is determined that the differential pressure ΔP across the filter 21 is equal to or less than the predetermined value ΔPa1, the process goes to step 10. At step 10, the determination is made using only the second estimated trapping quantity H2 without using the first estimated trapping quantity H1. That is, as shown in FIG. 8, the determination of the automatic regeneration treatment (step 21), the determination of the manual regeneration treatment (step 22), and the determination of the excessive deposit (step 25) are performed using only the second estimated trapping quantity H2 without using the first estimated trapping quantity H1.

In other words, in a case where the engine 10 is in the low rotational condition at step 8 (in a case where it is determined that the differential pressure ΔP across the filter 21 is equal to or less than the predetermined value ΔPa1), for the determination of the automatic regeneration treatment, the determination of the manual regeneration treatment, and the determination of the excessive deposit, the first estimated trapping quantity H1 that possibly degrades in accuracy is not used and the first estimated trapping quantity H1 is made ineffective, only the second estimated trapping quantity H2 is used. Therefore, it is possible to suppress the unnecessary automatic regeneration treatment, the manual regeneration treatment and the alarm of the excessive deposit due to the degradation in accuracy of the first estimated trapping quantity H1.

That is, as shown in the characteristic line 32 of a dashed-two dotted line in FIG. 5, in a case where the engine 10 is in the low rotational speed, even when the first estimated trapping quantity H1 is estimated as an excessive value by a combination of the smaller exhaust flow quantity and the smaller differential pressure ΔP, only the second estimated trapping quantity H2 is used for the determination during this state. This can suppress occurrence of the event that regardless of no necessity of executing the regeneration treatment, the first estimated trapping quantity H1 is estimated as a value larger than each of the automatic regeneration threshold value T1, the manual regeneration threshold value T2 and the excessive deposit threshold value T3, whereby it is possible to suppress the unnecessary regeneration treatment from being executed or the erroneous alarm of the excessive deposit defect from being given. As a result, it is possible to achieve an improvement on fuel consumption, an improvement on durability, suppression of dilution of engine oil (oil dilution), and an improvement on reliability in an alarm of the excessive deposit.

According to the first embodiment, it is determined whether or not the engine 10 is in the predetermined low rotational condition, based upon the differential pressure ΔP across the filter 21. Therefore, whether or not the engine 10 is in the low rotational condition, which possibly causes a degradation in accuracy of the first estimated trapping quantity H1, that is, whether or not the engine 10 is operating in the rotational speed N1 or less, can be stably determined based upon the differential pressure ΔP.

It should be noted that in the first embodiment, the process of steps 1 to 3 in FIG. 6 indicates a specific example of the first calculating unit that is an element in the present invention, and the process of steps 4 to 7 in FIG. 6 indicates a specific example of the second calculating unit. Further, the process of steps 8 to 10 in FIG. 6 (including the process of steps 11 to 19 in FIG. 7 and the process of steps 21 to 29 in FIG. 8) indicates a specific example of the regeneration determining unit that is an element in the present invention, and the process of step 8 and step 10 in FIG. 6 indicates a specific example of the low-rotational time processing unit.

Figure 9:
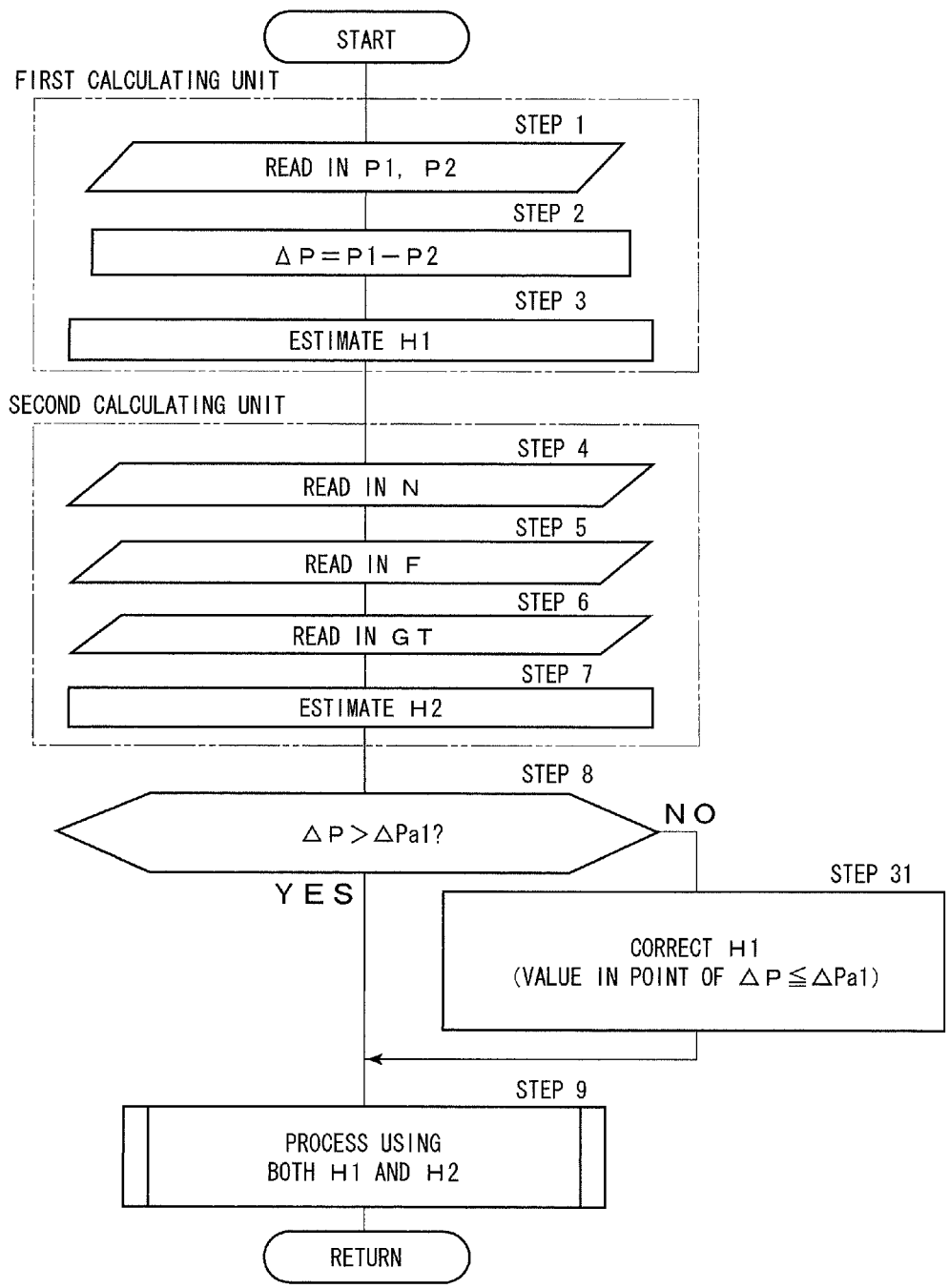
FIG. 9 is a flow chart showing regeneration treatment according to a second embodiment of the present invention.
Figure 10:
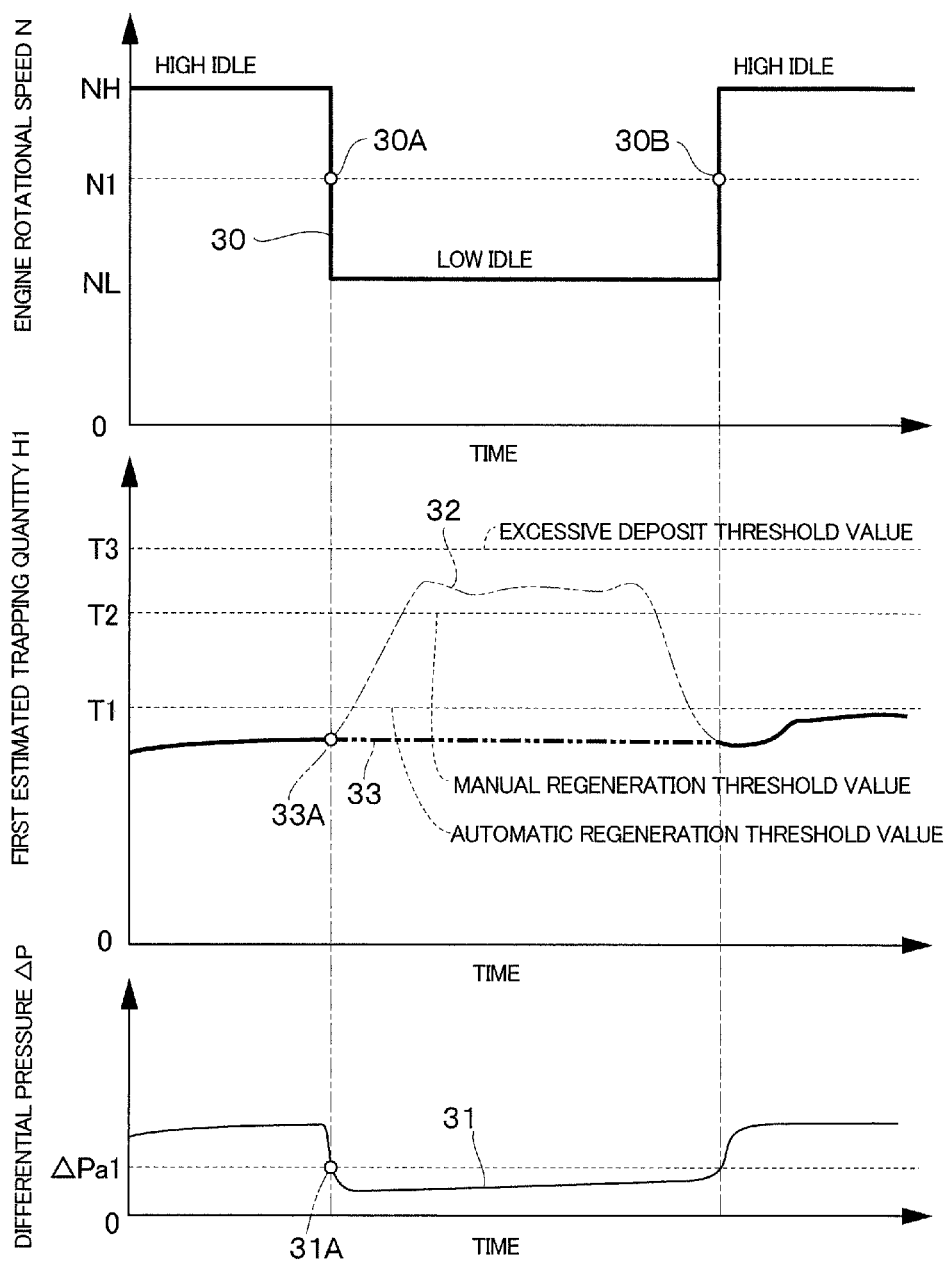
FIG. 10 is a characteristic line diagram showing an example of a change of an engine rotational speed N, a first estimated trapping quantity H1 and a differential pressure $\Delta P$ with time.

Next, FIG. 9 and FIG. 10 show a second embodiment of the present invention. The second embodiment is characterized in that when the engine is in a predetermined low rotational condition, there is provided a low-rotational time processing unit that makes the determination using a first estimated trapping quantity (H1) estimated by a first calculating unit in the point in time where the engine becomes in the predetermined low rotational condition. It should be noted that in the second embodiment, component elements that are identical to those in the aforementioned first embodiment will be simply denoted by the same reference numerals to avoid repetitions of similar explanations.

The controller 29 is activated by power supply of an accessory or by start of the engine 10 (ignition-on). When the process operation in FIG. 9 starts, as similar from step 1 to step 7 in FIG. 6 as described above, a first estimated trapping quantity H1 and a second estimated trapping quantity H2 are estimated (calculated), and as similar to step 8 in FIG. 6 as described above, it is determined whether or not the engine 10 is in a low rotational condition, that is, whether or not a differential pressure ΔP across the filter 21 is larger than a predetermined value ΔPa1.

In a case where the determination of "NO" is made at step 8, that is, in a case where it is determined that the differential pressure ΔP across the filter 21 is equal to or less than the predetermined value ΔPa1 (in a case where the engine 10 is in a low rotational condition), the first estimated trapping quantity H1 by the first calculating unit in the point in time the engine 10 is in the predetermined low rotational condition, that is, in the point in time the differential pressure ΔP across the filter 21 is equal to or less than the predetermined value ΔPa1 is used to make the determination on the regeneration treatment (automatic regeneration treatment, manual regeneration treatment, and an alarm of excessive deposit). That is, in this case, the process goes to step 31, wherein the first estimated trapping quantity H1 estimated at step 3 is corrected to a value of the first estimated trapping quantity H1 in the point in time the differential pressure ΔP across the filter 21 is equal to or less than the predetermined value ΔPa1.

In addition, the corrected first estimated trapping quantity H1 and the second estimated trapping quantity H2 estimated at step 7 are used to execute the process at the subsequent step 9. It should be noted that the determination of "YES" is made at step 8, that is, in a case where it is determined that the differential pressure ΔP across the filter 21 is larger than the predetermined value ΔPa1 (the engine 10 is not in the low rotational condition), the process goes to step 9 without via step 31.

The process at step 9 is the same as the process at step 9 in FIG. 6 as described above (steps 11 to 19 in FIG. 7). In a case where the determination of "YES" is made at step 8, in the same way as a case where the determination of "YES" is made at step 8 in the aforementioned first embodiment, the first estimated trapping quantity H1 estimated at step 3 and the second estimated trapping quantity H2 estimated at step 7 are used to execute the process. On the other hand, in a case where the determination of "NO" is made at step 8, the first estimated trapping quantity H1 corrected at step 31 and the second estimated trapping quantity H2 estimated at step 7 are used to execute the process without using the first estimated trapping quantity H1 estimated at step 3.

According to the second embodiment, in a case where it is determined at the process of step 8 that the engine 10 is in the predetermined low rotational condition, that is, in a case where it is determined that the differential pressure ΔP across the filter 21 is equal to or less than the predetermined value ΔPa1, the process at step 9 is executed using the first estimated trapping quantity H1 corrected at step 31 and the second estimated trapping quantity H2 estimated at step 7. Specifically, the automatic regeneration treatment determination at step 11 in the process in FIG. 7, the manual regeneration treatment determination at step 12 and the excessive deposit determination at step 15 that correspond to the process at step 9 are performed using the first estimated trapping quantity H1 corrected at step 31 and the second estimated trapping quantity H2 estimated at step 7. In other words, in a case where it is determined that the engine 10 is in the low rotational condition at step 8 (the differential pressure ΔP across the filter 21 is equal to or less than the predetermined value ΔPa1), for the automatic regeneration treatment determination, the manual regeneration treatment determination and the excessive deposit determination, the first estimated trapping quantity H1 that possibly degrades in accuracy is not used as it is and the first estimated trapping quantity H1 corrected at step 31, that is, the first estimated trapping quantity H1 in the point in time the engine 10 is in the low rotational condition (the differential pressure ΔP across the filter 21 is equal to or less than the predetermined value ΔPa1) is used.

A characteristic line 33 of a heavy dashed-two dotted line in FIG. 10 indicates the corrected first estimated trapping quantity H1 to be used in the second embodiment. In this case, the characteristic line 33 indicates a first estimated trapping quantity H1 in the point in time 31A the differential pressure ΔP becomes ΔPa1 or less, that is, in the point in time 30A a rotational speed N of the engine 10 becomes N1 or less in the process from a high idling speed (NH) to a low idling speed (NL). In this way, in the second embodiment, the value in the point in time 33A in the characteristic line 33 showing the first estimated trapping quantity H1 in FIG. 10 is used for the regeneration treatment. The characteristic line 33 in FIG. 10 continues to be used during a period where the rotational speed N of the engine 10 changes from a state of being higher than a predetermined value N1 to a state of being the predetermined value N1 or less and again becomes in a state of being higher than the predetermined value N1. In other words, the characteristic line 33 in FIG. 10 continues to be used during a period where a differential pressure ΔP changes from a state of being higher than a predetermined value ΔPa1 to a state of being the predetermined value ΔPa1 or less and again becomes in a state of being higher than the predetermined value ΔPa1.

By using the characteristic line 33 in this way, even when the first estimated trapping quantity H1 is estimated as an excessive value when the engine 10 is in the low rotational condition, the first estimated trapping quantity H1 (value in the point in time 33A) in the point in time 30A where the engine 10 becomes in the low rotational condition (in the point in time 31A where the differential pressure ΔP across the filter 21 becomes equal to or less than the predetermined value ΔPa1) is held.

Therefore, in the second embodiment, by using the characteristic line 33, the first estimated trapping quantity H1 is not estimated as a value larger than the automatic regeneration threshold value T1, the manual regeneration threshold value T2, or the excessive deposit threshold value T3. This can suppress the unnecessary regeneration treatment from being executed or the erroneous alarm of the excessive deposit defect from being given. As a result, it is possible to achieve an improvement on fuel consumption, an improvement on durability, suppression of dilution of engine oil (oil dilution), and an improvement on reliability in an alarm of the excessive deposit.

It should be noted that in the second embodiment, the process of steps 1 to 3 in FIG. 9 indicates a specific example of the first calculating unit that is an element in the present invention, and the process of steps 4 to 7 in FIG. 9 indicates a specific example of the second calculating unit. Further, the process of steps 8, 9 and 31 in FIG. 9 (including the process of steps 11 to 19 in FIG. 7) indicates a specific example of the regeneration determining unit that is an element in the present invention, and the process of step 8 and step 31, and step 9 subsequent to step 31 (including the process of steps 11 to 19 in FIG. 7) in FIG. 9 indicates a specific example of the low-rotational time processing unit.

Figure 11:
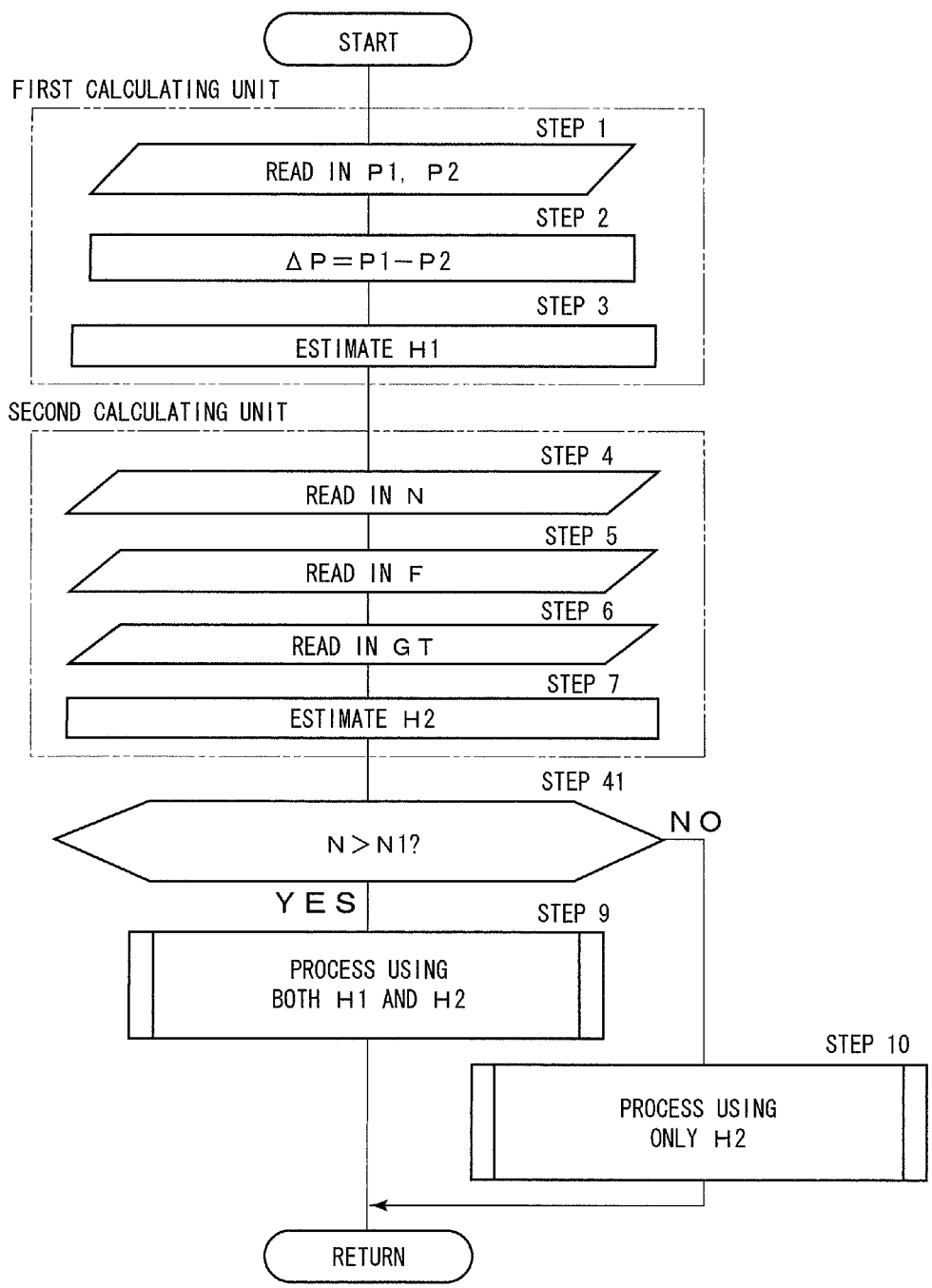
FIG. 11 is a flow chart showing regeneration treatment according to a third embodiment of the present invention.

Next, FIG. 11 shows a third embodiment of the present invention. The third embodiment is characterized in that it is determined whether or not an engine is in a predetermined low rotational condition, based upon a rotational speed (N) of the engine. It should be noted that in the third embodiment, component elements that are identical to those in the aforementioned first embodiment will be simply denoted by the same reference numerals to avoid repetitions of similar explanations.

Step 41 in FIG. 11 is used in the third embodiment in place of step 8 in FIG. 6 in the aforementioned first embodiment. At step 41, it is determined whether or not an engine is in a low rotational condition, based upon whether or not a rotational speed (N) of the engine is larger than a predetermined value N1. It should be noted that the predetermined value N1 is set as a rotational speed that cannot allow for, when the rotational speed N of the engine 10 becomes equal to or less than the rotational speed, a degradation in accuracy of the first estimated trapping quantity H1. The predetermined value N1 is in advance found by experiments, calculations, simulations or the like to be stored in the memory 29A of the controller 29 such that it becomes a boundary value (determination value) for being capable of suppressing unnecessary regeneration treatment (automatic regeneration treatment, manual regeneration treatment, and an alarm of excessive deposit) due to the degradation in accuracy of the first estimated trapping quantity H1.

The third embodiment determines whether or not the engine 10 is in the low rotational condition by step 41 as described above, and a basic operation thereof does not differ particularly from that of the aforementioned first embodiment. Particularly, according to the third embodiment, the low rotational condition of the engine 10 possibly causing a degradation in accuracy of the first estimated trapping quantity H1 can be stably determined based upon the rotational speed N.

It should be noted that in the third embodiment, the process of steps 1 to 3 in FIG. 11 indicates a specific example of the first calculating unit that is an element in the present invention, and the process of steps 4 to 7 in FIG. 11 indicates a specific example of the second calculating unit. Further, the process of steps 41, 9 and, 10 in FIG. 11 (including the process of steps 11 to 19 in FIG. 7 and the process of steps 21 to 29 in FIG. 8) indicates a specific example of the regeneration determining unit that is an element in the present invention, and the process of step 41 and step 10 in FIG. 11 indicates a specific example of the low-rotational time processing unit.

Figure 12:
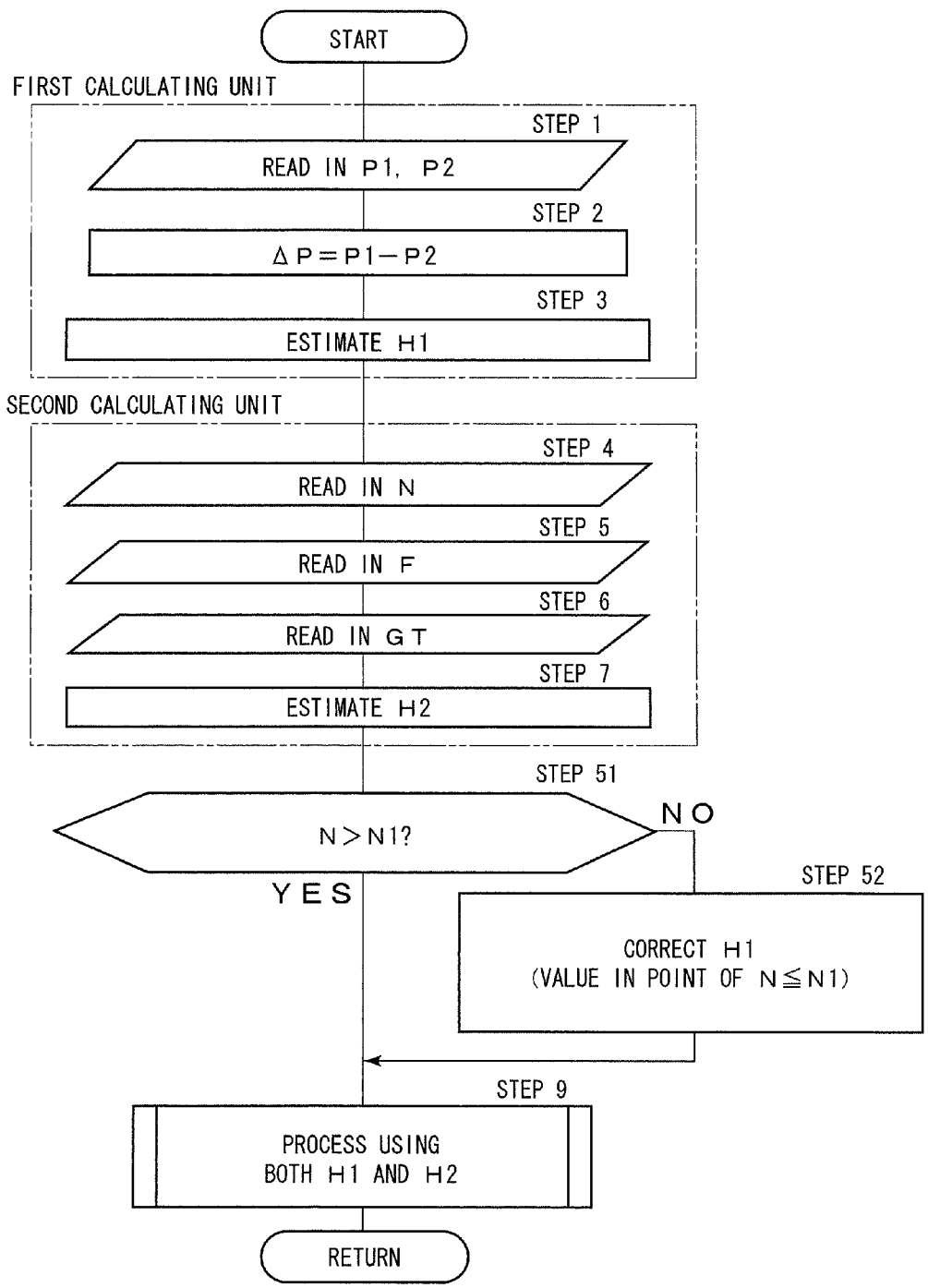
FIG. 12 is a flow chart showing regeneration treatment according to a fourth embodiment of the present invention.

Next, FIG. 12 shows a fourth embodiment of the present invention. The fourth embodiment is characterized by including a low-rotational time processing unit that, when an engine is in a predetermined low rotational condition, makes the determination using a first estimated trapping quantity (H1) by a first calculating unit in the point in time where the engine becomes in the predetermined low rotational condition and determines whether or not the engine is in the predetermined low rotational condition, based upon a rotational speed (N) of the engine. It should be noted that in the fourth embodiment, component elements that are identical to those in the aforementioned first embodiment, second embodiment and third embodiment will be simply denoted by the same reference numerals to avoid repetitions of similar explanations.

Step 51 in FIG. 12 executes the process as similar to step 41 in FIG. 11 in the aforementioned third embodiment. That is, at step 51, it is determined whether or not an engine 10 is in a low rotational condition, based upon whether or not a rotational speed (N) of the engine is larger than a predetermined value N1.

Step 52 in FIG. 12 corrects the first estimated trapping quantity H1 estimated at step 3 in the same way as step 31 in FIG. 9 in the aforementioned second embodiment. In this case, at step 31 in FIG. 9, as shown in FIG. 10 as described before, the first estimated trapping quantity H1 is corrected to a value of a first estimated trapping quantity H1 in the point in time 31A the differential pressure ΔP across the filter 21 becomes equal to or less than a predetermined value ΔPa1 (that is, a value in the point in time 33A). On the other hand, at step 52 in FIG. 12, as shown in FIG. 10, the first estimated trapping quantity H1 is corrected to a value of a first estimated trapping quantity H1 in the point in time 30A the rotational speed N of the engine 10 becomes equal to or less than a predetermined value N1 (that is, a value in the point in time 33A).

It should be noted that in the fourth embodiment, as shown in FIG. 10, the predetermined value N1 is set as one value, but may be set as a determination value that differs, for example, depending on when the rotational speed N of the engine 10 decreases (changes from a high idling side to a low idling side) or increases (changes from a low idling side to a high idling side). This respect is true of the predetermined value N1 used in the third embodiment. In addition, the predetermined value ΔPa1 of the differential pressure ΔP used in the first embodiment and the second embodiment may also be set as a determination value that differs, for example, depending on when the rotational speed N of the engine 10 decreases (when the differential pressure ΔP decreases) or increases.

The fourth embodiment determines whether or not the engine 10 is in the predetermined low rotational condition, based upon the rotational speed (N) of the engine 10, and makes the determination of the regeneration treatment (automatic regeneration treatment, manual regeneration treatment and an alarm of excessive deposit) using the first estimated trapping quantity (H1) estimated by the first calculating unit in the point in time 30A where the rotational speed N of the engine 10 becomes equal to or less than the predetermined value N1, that is, the value in the point in time 33A. In this case, as the first estimated trapping quantity H1, the value in the point in time 33A continues to be used during a period from the point in time 30A where the rotational speed N of the engine 10 becomes equal to or less than the predetermined value N1 to the point in time 30B where it again becomes higher than the predetermined value N1. Such a fourth embodiment can also obtain the operation and effect in the same way as in the aforementioned first embodiment, second embodiment and third embodiment.

It should be noted that in the fourth embodiment, the process of steps 1 to 3 in FIG. 12 indicates a specific example of the first calculating unit that is an element in the present invention, and the process of steps 4 to 7 in FIG. 12 indicates a specific example of the second calculating unit. Further, the process of steps 51, 9 and 52 in FIG. 12 (including the process of steps 11 to 19 in FIG. 7) indicates a specific example of the regeneration determining unit that is an element in the present invention, and the process of step 51, step 52 and step 9 subsequent to step 52 in FIG. 12 (including the process of steps 11 to 19 in FIG. 7) indicates a specific example of the low-rotational time processing unit.

Figure 13:
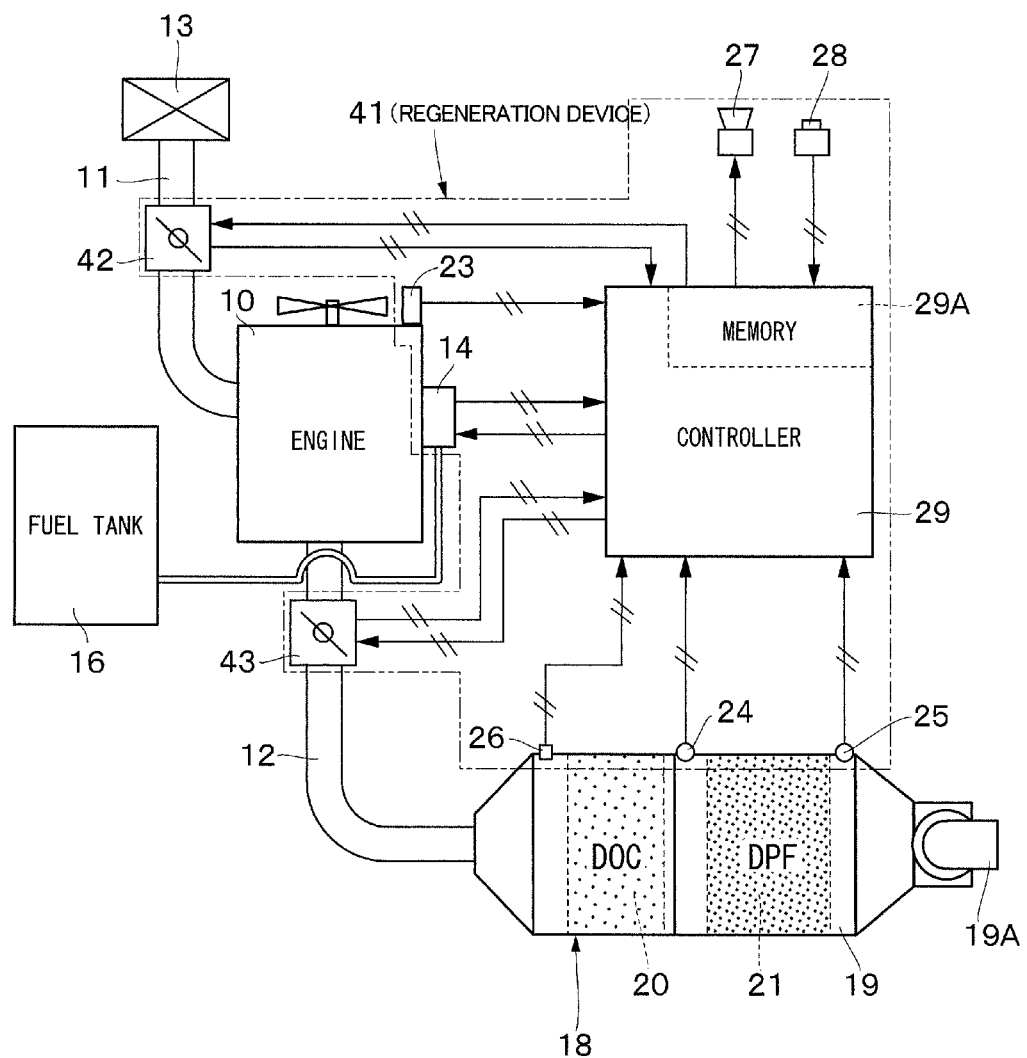
FIG. 13 is a circuit configuration diagram showing an engine, an exhaust gas purifying device, a regeneration device, and the like according to a fifth embodiment in the present invention, which is similar to that in FIG. 3.

Next, FIG. 13 shows a fifth embodiment in the present invention. The fifth embodiment is characterized by executing regeneration treatment, not by post injection, but by driving at least one of an intake throttle valve provided in an intake side of an engine and an exhaust throttle valve provided in an exhaust side thereof in a direction of throttling a flow passage thereof. It should be noted that in the fifth embodiment, component elements that are identical to those in the aforementioned first embodiment will be simply denoted by the same reference numerals to avoid repetitions of similar explanations.

In the figure, designated at 41 is a regeneration device for executing the regeneration treatment of the filter 21 by burning the particulate matter trapped in the filter 21. The regeneration device 41 is configured by including the fuel injection device 14, an intake throttle valve 42, an exhaust throttle valve 43, the rotational sensor 23, the pressure sensors 24 and 25, the exhaust gas temperature sensor 26, the alarming device 27, the manual regeneration switch 28 and the controller 29. The regeneration device 41, at the time of executing the regeneration treatment, drives at least one of the intake throttle valve 42 and the exhaust throttle valve 43 in a direction of throttling a flow passage thereof to burn and remove the particulate matter deposited in the filter 21. On the other hand, at the time of executing the manual regeneration treatment, an alarm sound or the like from the alarming device 27 is received to perform the post injection in the fuel injection device 14 by a manual operation of an operator, thus burning and removing the particulate matter deposited in the filter 21.

The intake throttle valve 42 is provided in the side of the intake pipe 11 of the engine 10, and forms part of the regeneration device 41 for executing the regeneration treatment of the filter 21. Here, the intake throttle valve 42 is regularly held in an opened state in response to a control signal from the controller 29 (for example, in an opening degree corresponding to a fuel injection quantity F or in a fully opened state). On the other hand, at the time of executing the automatic regeneration treatment, the intake throttle valve 42 is driven in the direction of throttling the flow passage by the control signal from the controller 29.

Thereby, the intake throttle valve 42 throttles an intake air quantity such that an air-fuel ratio of air and fuel becomes in a richer side. At this time, a temperature of an exhaust gas discharged to the side of the exhaust pipe 12 rises in a combustion chamber in the engine 10 by burning the fuel the air-fuel ratio of which has become in the richer side, thus making it possible to burn and remove the particulate matter trapped in the filter 21.

The exhaust throttle valve 43 is provided in the side of the exhaust pipe 12 of the engine 10, and the exhaust throttle valve 43 also forms part of the regeneration device 41 for executing the regeneration treatment of the filter 21. Here, the exhaust throttle valve 43 is regularly held in a fully opened state in response to a control signal from the controller 29. On the other hand, at the time of executing the automatic regeneration treatment, the exhaust throttle valve 43 is driven in the direction of throttling the flow passage in response to the control signal from the controller 29 to perform control of throttling the opening degree to be smaller.

Thereby, the exhaust throttle valve 43 throttles a flow quantity of an exhaust gas flowing in the exhaust pipe 12 to apply a back pressure to the engine 10 and increase loads to the engine 10. At this time, the controller 29 increases a fuel injection quantity F by the fuel injection device 14 of the engine 10 corresponding to the above-mentioned load. As a result, a temperature of the exhaust gas rises, thereby making it possible to burn and remove the particulate matter trapped in the filter 21.

The fifth embodiment executes the automatic regeneration treatment by driving at least one of the intake throttle valve 42 and the exhaust throttle valve 43 as describe above in the direction of throttling the flow passage, and does not particularly differ in the basic function from the aforementioned first embodiment.

Particularly, in a case of the fifth embodiment, since the automatic regeneration treatment is executed by driving at least one of the intake throttle valve 42 and the exhaust throttle valve 43 in the direction of throttling the flow passage, the automatic regeneration treatment can be executed at a lower temperature as compared to a case of executing the automatic regeneration treatment by the post injection. Thereby, durability of the filter 21 can be improved.

It should be noted that each of the aforementioned embodiments is explained by taking a case where the controller 29 is configured to perform the three determinations of the automatic regeneration treatment determination, the manual regeneration treatment determination and the excessive deposit determination as an example. However, the present invention is not limited thereto, but for example, a controller may be configured to perform the two determinations of the automatic regeneration treatment determination and the manual regeneration treatment determination. In this case, the controller may be configured to omit the process of steps 15, 18 and 19 in FIG. 7 and steps 25, 28 and 29 in FIG. 8.

It should be noted that each of the aforementioned embodiments is explained by taking a case where the second estimated trapping quantity H2 is configured to be estimated based upon the engine rotational speed N, the fuel injection quantity F and the exhaust gas temperature GT as an example. However, the present invention is not limited thereto, but the second estimated trapping quantity H2 may be configured to be estimated using not only the engine rotational speed N, the fuel injection quantity F and the exhaust gas temperature GT but also a combination of a temperature of each component of the filter and the like, a state amount of engine loads and the like (state amount representative of an operating condition), and the like together therewith.

It should be noted that each of the aforementioned embodiments is explained by taking a case where the exhaust gas purifying device 18 is configured with the oxidation catalyst 20 and the filter 21 as an example. However, the present invention is not limited thereto, and the exhaust gas purifying device may be configured, for example, by combining a urea injection valve, a selective reduction catalyst device and the like in addition to the oxidation catalyst and the particulate matter removing filter.

Further, each of the aforementioned embodiments is explained by taking a case where the exhaust gas purifying device 18 is mounted on the compact hydraulic excavator 1 as an example. However, the construction machine provided with the exhaust gas purifying device by the present invention is not limited thereto, and the exhaust gas purifying device by the present invention may be applied to a middle-sized or larger-sized hydraulic excavator. In addition, the exhaust gas purifying device by the present invention may widely be applied also to a construction machine such as a hydraulic excavator, a wheel loader, a fork lift, and a hydraulic crane that are provided with a wheel type lower traveling structure.

DESCRIPTION OF REFERENCE NUMERALS

1: Hydraulic excavator (Construction machine)
2: Lower traveling structure (Vehicle body)
4: Upper revolving structure (Vehicle body)
10: Engine
14: Fuel injection device
18: Exhaust gas purifying device
21: Filter
22, 41: Regeneration device
24, 25: Pressure sensor
26: Exhaust gas temperature
27: Alarming device
28: Manual regeneration switch
29: Controller
30: Characteristic line (Characteristics of engine rotational speed N)
31: Characteristic line (Characteristics of differential pressure $\Delta P$)
32: Characteristic line (Characteristics of erroneous first estimated trapping quantity H1 at reduction of differential pressure $\Delta P$)
33: Characteristic line (Characteristics of first estimated trapping quantity H1 in the point in time differential pressure $\Delta P$ becomes $\Delta Pa1$)
30A, 30B, 31A, 33A: Point in time

The invention claimed is:
1. A construction machine comprising:
an automotive vehicle body (2, 4);
an engine (10) that is mounted on said vehicle body (2, 4);
an exhaust gas purifying device (18) that is provided in an exhaust side of said engine (10) and includes a filter (21) for trapping particulate matter in an exhaust gas emitted from said engine (10); and
a regeneration device (22, 41) that burns the particulate matter trapped in said filter (21) in said exhaust gas purifying device (18) to execute regeneration treatment of said filter (21),
said regeneration device (22, 41) including:
a first calculating unit that estimates a trapping quantity of the particulate matter trapped in said filter (21) based upon at least a differential pressure ($\Delta P=P1-P2$) as a difference between pressure (P1) in an inlet side and pressure (P2) in an outlet side of said filter (21);
a second calculating unit that estimates a trapping quantity of the particulate matter trapped in said filter (21) based upon at least a rotational speed (N) of said engine (10), a fuel injection quantity (F) and an exhaust gas temperature (GT); and
a regeneration determining unit that determines whether or not the regeneration treatment is executed using a first estimated trapping quantity (H1) estimated by said first calculating unit and a second estimated trapping quantity (H2) estimated by said second calculating unit, characterized in that:
said regeneration determining unit is configured to include a low-rotational time processing unit that makes the determination using only the second estimated trapping quantity (H2) estimated by said second calculating unit when said engine (10) is in a predetermined low rotational condition or using the first estimated trapping quantity (H1) estimated by said first calculating unit in the point in time where said engine (10) becomes in the predetermined low rotational condition, and
said regeneration determining unit is configured to make the determination using both the first estimated trapping quantity (H1) estimated by said first calculating unit and the second estimated trapping quantity (H2) estimated by said second calculating unit when said engine (10) is not in the predetermined low rotational condition.

2. The construction machine according to claim 1, wherein
said regeneration determining unit is configured to perform an automatic regeneration treatment determination that determines whether or not the regeneration treatment is automatically executed and a manual regeneration treatment determination that determines whether or not an alarm is given an operator to manually execute the regeneration treatment, and said low-rotational time processing unit, when said engine (10) is in the predetermined low rotational condition, is configured to perform the automatic regeneration treatment determination and the manual regeneration treatment determination using only the second estimated trapping quantity (H2) by said second calculating unit or using the first estimated trapping quantity (H1) by said first calculating unit in the point in time where said engine (10) becomes in the predetermined low rotational condition.

3. The construction machine according to claim 1, wherein
said regeneration determining unit is configured to perform the automatic regeneration treatment determination that determines whether or not the regeneration treatment is automatically executed, the manual regeneration treatment determination that determines whether or not an alarm is given an operator to manually execute the regeneration treatment and an excessive deposit determination that determines whether or not the particulate matter is deposited excessively in said filter (21), and said low-rotational time processing unit, when said engine (10) is in the predetermined low rotational condition, is configured to perform the automatic regeneration treatment determination, the manual regeneration treatment determination and the excessive deposit determination using only the second estimated trapping quantity (H2) by said second calculating unit or using the first estimated trapping quantity (H1) by said first calculating unit in the point in time where said engine (10) becomes in the predetermined low rotational condition.

4. The construction machine according to claim 1, wherein
said low-rotational time processing unit is configured to determine whether or not said engine (10) is in the predetermined low rotational condition based upon the differential pressure ($\Delta P$), wherein when the differential pressure ($\Delta P$) is equal to or less than a predetermined value ($\Delta Pa1$), the determination is performed using only the second estimated trapping quantity (H2) by said second calculating unit or using the first estimated trapping quantity (H1) by said first calculating unit in the point in time where the differential pressure ($\Delta P$) becomes equal to or less than the predetermined value ($\Delta Pa1$).

5. The construction machine according to claim 1, wherein
said low-rotational time processing unit is configured to determine whether or not said engine (10) is in the predetermined low rotational condition based upon a rotational speed (N) of said engine (10), wherein when the rotational speed (N) is equal to or less than a predetermined value (N1), the determination is performed using only the second estimated trapping quantity (H2) by said second calculating unit or using the first estimated trapping quantity (H1) by said first calculating unit in the point in time the rotational speed (N) becomes equal to or less than the predetermined value (N1).

6. The construction machine according to claim 1, wherein
the state where said engine (10) is in the predetermined low rotational condition corresponds to a period from a state where the rotational speed (N) of said engine (10) is higher than the predetermined value (N1) to a state where it becomes equal to or less than the predetermined value (N1) and again, is higher than the predetermined value (N1), the point in time said engine (10) becomes in the predetermined low rotational condition corresponds to the point in time (30A) where the rotational speed (N) of said engine (10) becomes equal to or less than the predetermined value (N1), and the first estimated trapping quantity (H1) by said first calculating unit continues to use the value in the point in time (30A) during a period from the point in time (30A) where the rotational speed (N) of said engine (10) becomes equal to or less than the predetermined value (N1) to the point in time (30B) where it becomes again higher than the predetermined value (N1).

* * * * *